Figure 1:
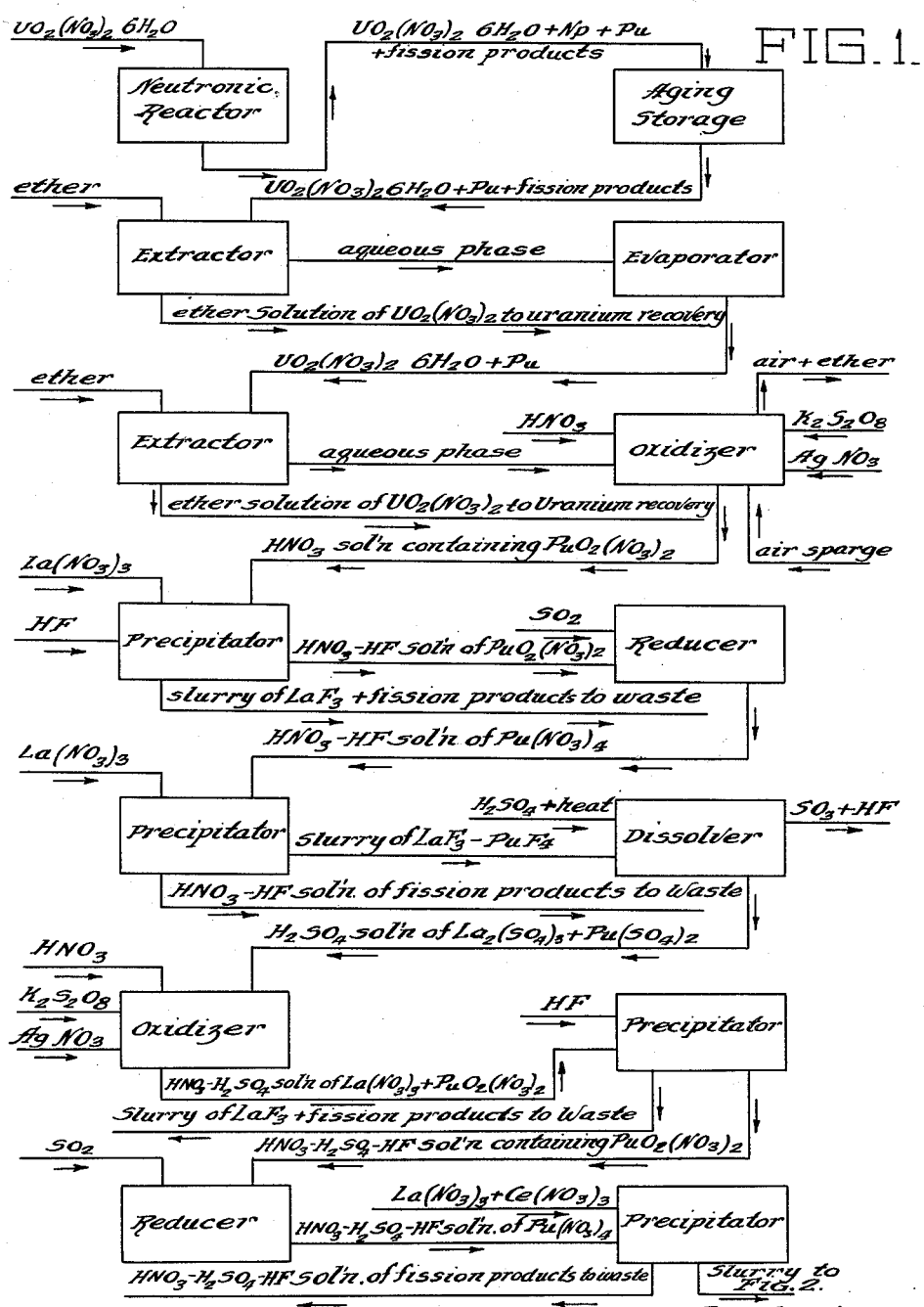

June 22, 1965  G. T. SEABORG ETAL  3,190,804
METHOD FOR PRODUCING, SEPARATING, AND PURIFYING PLUTONIUM
Filed Dec. 27, 1945  4 Sheets-Sheet 1

Inventors:
Glenn T. Seaborg
Arthur C. Wahl
Joseph W. Kennedy

June 22, 1965

G. T. SEABORG ETAL 3,190,804

METHOD FOR PRODUCING, SEPARATING, AND PURIFYING PLUTONIUM

Filed Dec. 27, 1945

4 Sheets-Sheet 2

Witnesses:
Stuart W. Scott
Foster York

Inventors:
Glenn T. Seaborg
Arthur C. Wahl
Joseph W. Kennedy
By: [signature]
Attorney.

June 22, 1965     G. T. SEABORG ETAL     3,190,804
METHOD FOR PRODUCING, SEPARATING, AND PURIFYING PLUTONIUM
Filed Dec. 27, 1945     4 Sheets-Sheet 3

Witnesses:
Stuart W. Scott
Foster York

Inventors:
Glenn T. Seaborg
Arthur C. Wahl
Joseph W. Kennedy
By: Robert A. [signature]
Attorney.

3,190,804
METHOD FOR PRODUCING, SEPARATING, AND PURIFYING PLUTONIUM
Glenn T. Seaborg, Chicago, Ill., Joseph W. Kennedy, Santa Fe, N. Mex., and Arthur C. Wahl, Berkeley, Calif., assignors to the United States of America as represented by the United States Atomic Energy Commission
Filed Dec. 27, 1945, Ser. No. 637,484
4 Claims. (Cl. 176—16)

This invention relates to a new chemical element of atomic number 94, to novel isotopes, compounds and compositions thereof, and to methods for producing, separating, and purifying same.

The term "element 94" is used throughout this specification to designate the element having atomic number 94. Element 94 is also referred to in this specification as plutonium, symbol Pu. Likewise, element 93 means the element having atomic number 93, which is also referred to as neptunium, symbol Np. Reference herein to any of the elements is to be understood as denoting the element generically, whether in its free state, or in the form of a compound, unless otherwise indicated by the context.

The apparent discovery of transuranic elements was first announced by Enrico Fermi in 1934. At that time, Fermi stated that the bombardment of uranium with neutrons gave beta activities which he attributed to transuranic elements of atomic number 93 and possibly higher. From 1934 to 1938 other workers, notably Hahn and Curie extended this work. But in 1939, Hahn discovered that the elements which he and others had believed to be transuranic elements were in fact radioactive elements of intermediate atomic weights produced by the fission of uranium. Hahn's results were subsequently confirmed and a great many other fission products in addition to those first found by Hahn were discovered and identified. Such products were all of lower atomic weight than uranium, generally of atomic number in the middle of the periodic system.

So far as is known, prior to about June 1940, no positive evidence was found indicating the existence of any transuranic element. However, in June 1940, E. McMillan and P. Abelson published in the Physical Review, 57, 1185 (1940) their discovery that a 2.3 day activity produced by the bombardment of uranium with neutrons was an isotope of element 93, probably $93^{239}$. Although it was assumed that the initial product of the beta decay of the 93 isotope of 2.3 day half-life would be a nucleus of atomic number 94, there was no proof that any such 94 nucleus could have more than an ephemeral existence before undergoing spontaneous disintegration. McMillan and Abelson found no evidence of the production of any daughter product from their 93 isotope, and, in fact did not even obtain the 93 isotope itself in pure or useful form.

The present invention relates to transuranic isotopes other than the $93^{239}$ isotope of McMillan and Abelson, and particularly to the various isotopes of a new element 94.

One aspect of the present invention relates to novel methods for the production of element 94. An object of this phase of the invention is to provide processes for the production of element 94 from uranium by nuclear reactions. A further object of this phase of the present invention is to provide processes for the production of various isotopes of element 94 by nuclear reactions initiated by the bombardment of natural uranium by subatomic particles. The neptunium isotopes $93^{238}$ and $93^{239}$ may be produced by the bombardment of uranium with high energy deuterons. The uranium to be bombarded may be the pure isotope $92^{238}$ but is conveniently natural uranium, which contains over 99 percent of this isotope. The uranium may be metallic uranium, an oxide such as $U_3O_8$, or any other desired uranium compound. The deuterons should have energies of at least 10 m.e.v. (million electron volts), and preferably energies of 14–16 m.e.v. or higher. The isotopes $93^{238}$ and $93^{239}$ are believed to be formed by the following nuclear reactions:

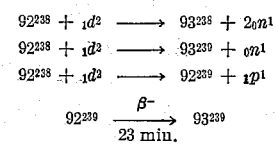

In accordance with the present invention it has been discovered that the decay products of the short lived beta emitting isotopes of neptunium are long lived alpha emitting isotopes of plutonium. These decay reactions may be represented as follows:

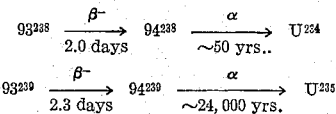

Since the decay of neptunium to plutonium takes place both during and after bombardment of uranium with deuterons or neutrons, the percentage of plutonium in the transuranic fraction of the product can be controlled by varying the bombardment time, the time of aging after bombardment, or both. Thus, in the deuteron bombardment of uranium, the transuranic fraction of isotopes of mass 238 will be predominantly plutonium after five days of bombardment or after one day of bombardment followed by two days aging. Similarly, in the neutron bombardment of uranium, the transuranic fraction of the product will be predominantly plutonium after six days of bombardment or after two days of bombardment followed by two days aging.

For the production and recovery of plutonium, it is preferred to employ a total time of bombardment plus aging such that at least 90 percent of the transuranic fraction of the product consists of plutonium. Examples of minimum bombardment and aging times to accomplish this end in the neutron bombardment of uranium are shown in the following table:

TABLE I

| Days of bombardment | Days of aging |
|---|---|
| 2 | 7 |
| 10 | 4 |
| 20 | 2 |
| 33 | 0 |

Although the desired plutonium concentration in the transuranic fraction of the product may be obtained by sufficient bombardment time alone, it will be evident that a finite aging time will necessarily ensue before the plutonium can be separated from the bombarded product. In the present specification and claims, therefore, it is postulated that the bombarded product is always aged, and that the plutonium concentration in the transuranic fraction of the product is controlled by the total time of bombardment plus aging.

The production of plutonium by deuteron bombardment of uranium followed by aging of the bombarded product will be further illustrated by the following examples:

*Example 1*

Uranium oxide, comprising predominantly $U_3O_8$ with a minor amount of $UO_3$, was subjected to 230 microampere hours bombardment with 15 m.e.v. deuterons from a cyclotron. Neptunium was separated from the bombarded mass by chemical means, using cerous fluoride carrier precipitations to obtain a product suitable for radioactive analysis for neptunium content. The amount of neptunium present at the end of the bombardment was then determined by analysis of the beta radiation decay of the product. The yield of neptunium was found to be approximately 28 curies per ampere hour of bombardment. This neptunium was transformed into a substantially equal mass, and equivalent number of curies, of plutonium after aging for 30 days.

*Example 2*

Uranium metal was subjected to a short bombardment with 15 m.e.v. deuterons, and the neptunium was separated from the bambarded material by chemical means to obtain a product containing neptunium as the only beta emitting radioactive element. The quantities of the 2.0 day isotope $93^{238}$ and the 2.3 day isotope $93^{239}$ present at the end of the bombardment were then determined by analysis of the radioactive decay of the total 93. The yields were found to be 36.2 micrograms of $93^{238}$ and 320 micrograms of $93^{239}$ per ampere hour of bombardment. After aging for 60 days, the yields of $94^{238}$ and $94^{239}$ derived from the separated neptunium were thus approximately 36.2 micrograms of $94^{238}$ and 320 micrograms of $94^{239}$ per ampere hour of bombardment.

*Example 3*

Separate samples of uranium metal were subjected to short bombardments with deuterons of different energies, and then aged for sufficient time to permit decay of substantially all of the $93^{238}$ and $93^{239}$ to $94^{238}$ and $94^{239}$. Element 94 was then separated from the aged material by chemical precipitation methods to obtain products containing no radioactive elements other than element 94. These products were then analyzed for alpha radiation. Since the decay rate of $94^{239}$ is negligible compared to the decay rate of $94^{238}$, the total radioactivity was ascribed to $94^{238}$. The yields of $94^{238}$ determined in this manner were found to be as follows:

| Deuteron Energy (million electron volts) | Yield of $94^{238}$ (micrograms per ampere hour of bombardment) |
| --- | --- |
| 15 | 29.4 |
| 12 | 4.3 |
| 8 | <0.0003 |

Plutonium has been successfully produced in accordance with the present invention by the bombardment of uranium with an external source of neutrons, such as a deuteron-beryllium source, adjusting the bombardment and aging times to secure a product in which the transuranic fraction is substantially all plutonium, and thereafter isolating the plutonium. Much higher production rates are obtainable, however, by the use of neutronic reactors of the type described in co-pending application Serial No. 568,904 of E. Fermi and L. Szilard, filed December 19, 1944, now U.S. Patent No. 2,708,656, granted on May 17, 1955. In such reactors a fissionable isotope, such as $U^{235}$ in natural uranium, undergoes fission and releases fast neutrons in excess of the neutrons absorbed in the fission process. The fast neutrons are slowed down to approximately thermal energies by impacts with a moderator such as graphite or deuterium oxide, and the resulting slow neutrons (energies of 0-0.3 electron volt) are then absorbed by $U^{235}$ to produce further fission and by $U^{238}$ to produce $U^{239}$ which decays through $93^{239}$ to $94^{239}$. This self-sustaining chain reaction releases tremendous amounts of energy, primarily in the form of kinetic energy of the fission fragments. With such reactors the maximum reaction rate for steady state operation is determined by the maximum rate at which the heat of reaction can be removed. The rate of production of plutonium in such reactors may thus be equated, approximately, to the power output of the reactor, and amounts to about 0.9 gram of $94^{239}$ per megawatt day when operating with sufficient bombardment and aging times to permit total decay of $93^{239}$ to $94^{239}$.

It is to be understood, of course, that the above examples of methods for the production of $94^{238}$ and $94^{239}$ are merely illustrative and do not limit the scope of this phase of the present invention. Sources of high energy deuterons or low energy neutrons other than the particular sources of the examples may be employed, and various modifications of the operating procedures may also be used. Equivalent nuclear reactions may be utilized, as for example, the bombardment of uranium with any sub-atomic particle of suitable energy to produce a beta-emitting neptunium isotope, with control of bombardment and aging times to permit recovery of a transuranic fraction comprising essentially plutonium.

Further aspects of the present invention relate to methods for the separation and purification of plutonium, and especially to methods for the separation and decontamination of the plutonium contained in masses of deuteron bombarded uranium or neutron bombarded uranium.

One phase of the present invention which is especially useful in plutonium recovery processes relates to methods for the control of the state of oxidation of plutonium. An object of this phase of the invention is to provide means for attaining a plurality of oxidation states of plutonium. Another object of this phase of the invention is to provide methods for oxidizing plutonium from a lower to a higher valence state, and for reducing plutonium from a higher to a lower valence state. A further object is to provide means for stabilizing lower and higher oxidation states of plutonium in aqueous solutions of plutonium ions. Additional objects and advantages of this phase of the present invention will be evident from the following description.

In accordance with the present invention it has been found that plutonium is chemically unlike osmium in many respects, and is probably a member of a second rare earth group, the actinide series. It has further been discovered that plutonium, unlike a number of other members of this series, possesses a plurality of valence states. Plutonium has at least four valence states, including +3, +4, +5, and +6. In 0.5 M.–1.0 M. aqueous hydrochloric acid the oxidation-reduction potentials are of the following magnitudes:

$Pu^{+3} \rightarrow Pu^{+4} + E^{-} - .097$ v.
$Pu^{+4} + 2H_2O \rightarrow PuO_2^{+} + 4H^{+} + E^{-} - 1.11$ v.
$PuO_2^{+} \rightarrow PuO_2^{+2} + E^{-} - 0.92$ v.
$Pu^{+4} + 2H_2O \rightarrow PuO_2^{+2} + 4H^{+} + 2E^{-} - 1.015$ v.

As may be seen from the above couples, the stability of the higher oxidation states is dependent on the hydrogen ion concentration. In moderately acidic solutions the $Pu^{+5}$ ion is generally very unstable, and disproportionates to $Pu^{+4}$ and $Pu^{+6}$. The $Pu^{+4}$ ion is capable of disproportionating to the $Pu^{+3}$ ion and the $PuO_2^{+2}$ ion, and in dilute aqueous hydrochloric acid this disproportionation may take place to a considerable extent. The $Pu^{+4}$ disproportionation is opposed, however, by increase in hydrogen ion concentration and by the presence of ions which tend to complex or otherwise stabilize the $Pu^{+4}$ ion. The effect of additional ions in hydrochloric acid solutions is illustrated by the following potentials for the $Pu^{+3} \rightarrow Pu^{+4}$ couple:

1.0 M. HCl _____ −0.97 v.
1.0 M. HCl—0.1 M. $H_3PO_4$ _____ −0.80 v.
1.0 M. HCl—1.0 M. HF _____ −0.53 v.

Generally the anions of slightly ionized acids tend to complex the $Pu^{+4}$ ion to a much greater extent than the anions of highly ionized acids. Thus, $Pu^{+4}$ is only slightly complexed by $ClO_4^-$, $Cl^-$, and $NO_3^-$; it is complexed to a much greater extent by $SO_4^{-2}$; and it is very strongly complexed by $PO_4^{-3}$, $F^-$, $C_2H_3O_2^-$, and $C_2O_4^{-2}$.

In addition to the complexing effect of the anions of the acids employed as solvents for plutonium, certain of these acids may also serve as oxidizing agents. However, at room temperatures, or moderately elevated temperatures, and in the absence of oxidation catalysts, the rate of oxidation by the acid is often so low that this effect may be ignored. Thus, the $Pu^{+4}$ ion is stable for considerable periods of time in perchloric acid, although under proper conditions, the latter is capable of oxidizing $Pu^{+4}$ to $PuO_2^{+2}$. It is therefore desirable to control the state of oxidation of the plutonium by the use of oxidizing agents and reducing agents which have rapid reaction rates under the conditions employed for processing the solutions.

The $Pu^{+4}$ ion may suitably be oxidized to the $PuO_2^{+2}$ ion by the addition of an active oxidizing agent having an oxidation-reduction potential substantially more negative than the oxidation-reduction potential of the $Pu^{+4} \rightarrow PuO_2^{+2}$ couple in the particular solution employed. The following are representative potentials for this couple:

| | |
|---|---|
| 1.0 M. HCl | −1.0 v. |
| 1.0 M. HNO₃ | −1.1 v. |
| 1.0 M. H₂SO₄ | −1.3 v. |

Oxidizing agents having adequate oxidation-reduction potentials for use in such solutions may be chosen by reference to tables such as the table of standard oxidation-reduction potentials given in the Reference Book of Inorganic Chemistry by Latimer and Hildebrand (The MacMillan Company, New York, 1934).

It is generally desirable to effect purification and concentration of plutonium in nitric acid solutions. Examples of oxidizing agents for use in such solutions are bromates, permanganates, dichromates, silver-catalyzed peroxydisulfates, and ceric compounds. To effect the oxidation, a quantity of oxidizing agent at least equivalent to the amount of plutonium is added to the solution, and the resulting mixture is digested at a moderately elevated temperature for a sufficient period of time to insure complete oxidation of the plutonium. In most cases, this digestion may suitably be effected at 60–80° C. for 15–60 minutes. In order to maintain the plutonium in the hexavalent state for considerable periods of time after oxidation, it is desirable to employ an excess of oxidizing agent to serve as a holding oxidant. This is especially true if an acid solution is to be processed in ferrous metal equipment, or under other conditions permitting subsequent reduction of the plutonium.

Neptunium may be oxidized by any of the oxidizing agents mentioned above, without the necessity of digestion at an elevated temperature. This greater rapidity of oxidation of neptunium at low temperatures may be utilized to effect preferential oxidation of neptunium without substantial oxidation of plutonium. The preferred oxidizing agent for this purpose is the bromate ion. At temperatures of 15–25° C. neptunium may be substantially completely oxidized by alkali metal bromates in nitric acid solutions, which contain ions such as $SO_4^{-2}$ ions to complex +4 plutonium, without appreciable oxidation of plutonium to the hexavalent state. There is some evidence that bromate oxidation of plutonium may be catalyzed by cerium, and it is therefore desirable to effect the preferential oxidation of neptunium in cerium-free solutions.

For the reduction of plutonium, reducing agents of adequate potential may be selected by reference to tables of standard potentials such as the table previously referred to. The reduction may suitably be effected by digestion at room temperature or slightly elevated temperatures. Digestion for 15 to 60 minutes at 15 to 35° C. will generally be satisfactory.

For the reduction of $PuO_2^{+2}$ or $Pu^{+4}$ to $Pu^{+3}$, the reducing agent should have an oxidation-reduction potential substantially more positive than the oxidation-reduction potential of the $Pu^{+3} \rightarrow Pu^{+4}$ couple in the solution employed. Thus, in 1.0 M. HCl an active reducing agent having a potential more positive than −0.97 v. will be required, and in 1.0 M. HNO₃, a potential more positive than −0.92 v. will be necessary. In order to maintain the plutonium in the +3 valence state for appreciable periods of time, it is desirable to maintain an excess of the reducing agent in solution.

In order to reduce $PuO_2^{+2}$ to $Pu^{+4}$ without reducing $Pu^{+4}$ to $Pu^{+3}$, it is desirable to employ an active reducing agent having an oxidation-reduction potential substantially more positive than the oxidation-reduction potential of the $Pu^{+4} \rightarrow PuO_2^{+2}$ couple, and substantially more negative than the oxidation-reduction potential of the $Pu^{+3} \rightarrow Pu^{+4}$ couple, in the solution used. A wider selection of reducing agents of the desired potential will be available for use in solutions containing ions which complex the $Pu^{+4}$ ion than are available for use in solutions which are substantially free from complexing effects. Thus, in 1.0 M. HCl and 1.0 M. HCl–1.0 M. HF, the oxidation-reduction potentials are approximately:

| | 1.0 M. HCl, v. | 1.0 M. HCl–1.0 M. HF, v. |
|---|---|---|
| $Pu^{+4} \rightarrow PuO_2^{+2}$ | −1.0 | −1.2 |
| $Pu^{+3} \rightarrow Pu^{+4}$ | −0.9 | −0.5 |

It may be seen that in the solution containing fluoride ion reducing agents such as hydrogen peroxide and ferrous iron, which have oxidation-reduction potentials of −0.68 v. and −0.74 v. respectively, will reduce $PuO_2^{+2}$ only to $Pu^{+4}$; whereas in the solution without fluoride ion to complex the $Pu^{+4}$ ion, these reducing agents will tend to reduce the plutonium to the +3 state. A reducing agent such as sulfur dioxide, having an oxidation-reduction potential of −0.14 v. will tend to reduce the plutonium to the +3 state in either solution.

When employing the preferred solutions of plutonium in aqueous nitric acid, the reduction of $PuO_2^{+2}$ to $Pu^{+4}$ is preferably effected in the presence of a complexing ion, employing reducing agents having oxidation-reduction potentials of the same magnitude as hydrogen peroxide and ferrous iron. However, it is also possible to use stronger reducing agents such as sulfur dioxide if any excess reducing agent is removed or destroyed after the initial reduction is effected. In any case, if $Pu^{+4}$ is desired, the hydrogen ion concentration should be sufficiently high to oppose the disproportionation of $Pu^{+4}$ to $Pu^{+3}$ and $PuO_2^{+2}$. For this purpose, it is desirable to employ solutions having a pH not substantially above 2, and preferably considerably below 1. In the case of aqueous nitric acid solution, it is generally desirable to maintain a free acid concentration of at least 1 M.

It will be apparent that the considerations discussed above will also apply to the oxidation of $Pu^{+3}$ to $Pu^{+4}$, without oxidizing $Pu^{+4}$ to $PuO_2^{+2}$, by the use of oxidizing agents having potentials intermediate the potentials of the two plutonium couples.

The plutonium oxidation and reduction processes described above may be employed, if desired, for the simultaneous oxidation or reduction of both neptunium and plutonium. Such simultaneous oxidation or reduction will be attained provided equilibrium is reached. As previously pointed out, however, differential reaction rates may be utilized to attain one oxidation state for neptunium and another oxidation state for plutonium.

The solutions of plutonium ions of the various valence states described above are useful for the electro-deposition of plutonium, for the precipitation of plutonium compounds while leaving contaminating compounds in solution, and for the precipitation of contaminating compounds while leaving plutonium in solution, as will be discussed in detail in the description of other phases of the present invention.

The oxidation state of plutonium in aqueous solutions of the various plutonium cations may be determined in accordance with methods commonly used for the determination of the valence state of other metals in solution. Thus, the total plutonium in solution may be determined by quantitative gravimetric or radiometric analysis, and the percentage of any particular ion may then be determined by a suitable differential analysis, such as quantitative oxidation or reduction, polarographic analysis, or the like. Spectrophotometric analysis is especially advantageous for determining qualitatively or quantitatively the various plutonium ions in solution, in view of the sharp characteristic peaks in the absorption spectra for the different valence states. Representative molar extinction coefficients for the $Pu^{+3}$, $Pu^{+4}$, and $PuO_2^{+2}$ ions in aqueous inorganic acid solutions are given in the following tables:

tion procedure for the selective extraction of uranyl nitrate from aqueous compositions containing uranyl nitrate, uranium fission products, and plutonium.

An additional object is to provide an ether extraction process for the treatment of neutron irradiated uranyl nitrate hexahydrate or deuteron irradiated uranyl nitrate hexahydrate to separate an ether phase containing the major portion of the uranyl nitrate from an aqueous phase containing plutonium and uranium fission products.

Other objects and advantages of this phase of the present invention will be evident from the following description.

If uranium is subjected to neutron or deuteron bombardment, even for prolonged periods of time, the bombarded product comprises predominantly unconverted uranium with only very low concentrations of uranium fission products and plutonium. A desirable preliminary step in the recovery of the plutonium from such material consists in separating the major portion of the unconverted uranium, thus reducing the bulk of the plutonium

TABLE 2

| | $Pu^{+3}$ in 1 M. HCl | | | | | | | | |
|---|---|---|---|---|---|---|---|---|---|
| Wave length in A | 4,260 | 4,560 | 4,740 | 5,050 | 5,620 | 6,010 | 6,660 | 8,000 | 9,090 |
| Molar extinction coefficient | 12.0 | 4.7 | 4.0 | 3.5 | 37.4 | 37.9 | 15.0 | 15.0 | 18.9 |

TABLE 3

| | $Pu^{+4}$ in 1 M. HNO$_3$ | | | | | | | | |
|---|---|---|---|---|---|---|---|---|---|
| Wave length in A | 4,040 | 4,220 | 4,480 | 4,760 | 5,020 | 5,460 | 6,600 | 7,080 | 8,000 | 8,550 |
| Molar extinction coefficient | 27.0 | 24.5 | 17.5 | 72.5 | 8.7 | 17.0 | 31.0 | 14.0 | 18.9 | 13.2 |

TABLE 4

| | $Pu^{+4}$ in 1 M. H$_2$SO$_4$ | | | | | | | |
|---|---|---|---|---|---|---|---|---|
| Wave length in A | 4,090 | 4,360 | 4,810 | 5,480 | 6,640 | 7,200 | 8,140 | 8,510 |
| Molar extinction coefficient | 29.2 | 28.5 | 85.2 | 20.0 | 39.6 | 21.0 | 27.1 | 14.3 |

TABLE 5

| | $PuO_2^{+2}$ in 1 M. HNO$_3$ | | | | | | | |
|---|---|---|---|---|---|---|---|---|
| Wave length in A | 4,590 | 4,700 | 5,060 | 5,220 | 6,240 | 8,310 | 9,580 | 9,870 |
| Molar extinction coefficient | 15.0 | 14.0 | 14.0 | 14.0 | 10.0 | 171.0 | 23.0 | 17.0 |

The particular oxidizing and reducing agents, processes, and solutions discussed above are merely illustrative and are not to be construed as limiting the scope of this phase of the present invention. Other oxidizing and reducing agents having the required potentials may be utilized instead of those specifically mentioned, and the procedures may be modified in numerous respects, as will be evident to those skilled in the art.

A further aspect of the present invention relates to the separation of plutonium from uranium, and especially to the separation of plutonium from neutron irradiated uranium or deuteron irradiated uranium.

An object of this phase of the invention is to provide a method for selectively separating uranium from aqueous compositions containing uranium and plutonium.

Another object of this aspect of the invention is to provide a method for extracting the bulk of the uranium from aqueous compositions containing uranyl nitrate and plutonium.

A further object is to provide an organic solvent extracfraction and concentrating the plutonium with respect to the remaining uranium.

In accordance with the present invention it has been discovered that plutonium in an oxidation state not greater than +4 may be maintained in an aqueous phase while extracting hexavalent uranium from said aqueous phase into an organic solvent. For this purpose any of the organic solvents which are known to dissolve uranyl compounds may be employed. The preferred class of solvents comprise normally liquid organic solvents which are substantially immiscible with the aqueous solution to be extracted and which contain at least one atom capable of donating an electron pair to a coordination bond. Compounds containing oxygen donor atoms, such as alcohols, alkyl ethers, glycol ethers, ketones, and nitrohydrocarbons, are particularly desirable solvents. For the extraction of hexavalent uranium from tetravalent plutonium, it is preferred to employ an ether, and particularly diethyl ether, as the solvent. For the extraction of hexavalent uranium from trivalent plutonium, it is preferred to employ a ketone, and especially methyl isobutyl ketone.

It has been discovered that the plutonium in neutron-bombarded or deuteron-bombarded uranyl nitrate hexahydrate is in the tetravalent state. The bombarded crystalline hexahydrate may thus be directly extracted with a suitable volume of solvent, for example from 1 to 20 times the volume of the hexahydrate, to obtain an organic phase containing the bulk of the uranyl nitrate and an aqueous phase of smaller volume comprising the original water of crystallization, a minor portion of the uranyl nitrate, and the bulk of the uranium fission products and plutonium.

Instead of directly extracting crystalline hexahydrate, the bombarded material may first be dissolved in nitric acid or other suitable aqueous solvent. Similarly, bombarded uranium metal, uranium oxides, or other uranium compounds may be dissolved in aqueous inorganic acids to form solutions suitable for extraction. It is generally preferred to employ nitric acid for this purpose, in order to obtain directly a solution of hexavalent uranium. The plutonium in the resulting solution may then be stabilized in the +3 or +4 oxidation state by means of reducing agents which have insufficient potentials to reduce the hexavalent uranium.

For the extraction of uranyl nitrate from solutions containing tetravalent plutonium, it is desirable to have a high initial uranyl nitrate concentration in the aqueous phase; suitable solutions contain at least 30 percent by weight of uranyl nitrate hexahydrate, and preferably considerably higher concentrations. The uranyl nitrate solutions may suitably be concentrated until saturated with respect to the hexahydrate or even to the point where the entire mass will solidify, on cooling, as crystalline hexahydrate. Other soluble salts should be excluded from the aqueous solution, insofar as practicable, in order to prevent salting-out the plutonium into the organic phase. Similarly, excessive acid concentrations should be avoided in order to minimize extraction of plutonium by the organic solvent.

It has further been discovered, in accordance with the present invention, that trivalent plutonium has much less tendency to extract into the organic phase than tetravalent plutonium. Thus, high acid concentrations and high concentrations of salting-out agents may be employed to increase the efficiency of the uranium extraction without danger of excessive extraction of trivalent plutonium. The preferred salting-out agents comprise inorganic salts having high solubility in the solution to be extracted, low solubility in the extract phase, and a common ion with respect to the compound being extracted. Thus, for the extraction of uranyl nitrate, the following nitrates are suitable salting-out agents:

$NaNO_3$            $Ca(NO_3)_2$
$KNO_3$             $Sr(NO_3)_2$
$LiNO_3$            $Mg(NO_3)_2$
$NH_4NO_3$          $La(NO_3)_3$
$Mn(NO_3)_2$        $Al(NO_3)_3$

The concentration of salting-out agent which is desirable in any particular case will depend on the valence of the cation and the concentration of the common anion due to free acid in the solution. In the case of 1 N. nitric acid solutions, it is desirable to employ a concentration of a univalent nitrate of at least 3 M. and preferably 5–10 M. Equivalent concentrations of polyvalent nitrates may be employed at the same acid concentration, and the salt concentration may suitably be increased or decreased with decrease or increase of the acid concentration.

In carrying out the process of this phase of the present invention, previously known extraction procedures and apparatus may be employed. The extraction may be effected by batch, continuous batch, batch counter-current, or continuous counter-current methods. Batch operation is generally preferred for the extraction of solutions containing tetravalent plutonium, whereas continuous counter-current operation may advantageously be applied to the extraction of solutions containing trivalent plutonium. A two-stage batch process, employing in each stage from 2 to 10 volumes of solvent per volume of material to be extracted, or an equivalent counter-current process, will usually effect adequate preliminary separation of uranium to permit efficient operation of subsequent chemical methods for plutonium recovery. A greater number of batch stages or greater quantities of solvent in countre-current operation may, however, be employed if desired.

This phase of the present invention will be further illustrated by the following specific examples:

Example 4

Uranyl nitrate hexahydrate containing tetravalent plutonium in tracer concentration was extracted with approximately 28 times its volume of ether, and the aqueous layer was re-extracted with a quantity of ether equal to that used in the first extraction. The aqueous raffinate was then acidified with about 1.5 times its volume of 16 N. aqueous nitric acid, and the resulting nitric acid solution was extracted with approximately 20 times its volume of ether.

The other extracts and the final aqueous raffinate were analyzed for plutonium by a precipitation procedure designed to leave uranium unprecipitated and to yield precipitates containing plutonium as the only alpha-active component. Radioactive analyses of the precipitates showed the aqueous raffinate to contain approximately 89 percent of the total alpha radiation, whereas the ether extracts contained only 11 percent. On the other hand, analysis of the aqueous raffinate for uranium by evaporation and ignition to $U_3O_8$ showed that it contained less than 0.3 percent of the original uranium.

Example 5

Uranyl nitrate hexahydrate, which had been subjected to bombardment with neutrons from 100 milliampere hours bombardment of beryllium with 12 m.e.v. deuterons over a period of 20 days, was aged for 8 days prior to extraction with ether. Approximately 700 pounds of the bombarded and aged material was extracted with about 84 gallons of diethyl ether. The aqueous phase was evaporated to reduce the water content to that of uranyl nitrate hexahydrate, and about 90 pounds of recrystallized hexahydrate was thus obtained. The recrystallized material was then re-extracted with 10.8 gallons of diethyl ether. The aqueous raffinate thus obtained had a volume of approximately 1.64 gallons and contained approximately 1.66 percent of the original uranium. This solution was analyzed for plutonium and was found to contain 353 micrograms, corresponding to a yield of 3.5 micrograms per milliampere hour of bombardment.

Example 6

Ammonium nitrate is added as a salting-out agent to a nitric acid solution containing uranyl nitrate, uranium fission products, and trivalent plutonium. The concentrations of uranium, nitric acid, and ammonium nitrate in the resulting solution are as follows:

| | M. |
|---|---|
| Uranyl nitrate | 1.08 |
| Nitric acid | 1.86 |
| Ammonium nitrate | 6.75 |

This solution is then extracted with approximately 6.5 times its volume of methyl isobutyl ketone. Approximately 95 percent of the uranyl nitrate is extracted by the ketone, together with less than 1 percent of plutonium.

It is to be understood, of course, that the above examples are merely illustrative, and do not limit the scope of this phase of the invention. Other aqueous compositions containing hexavalent uranium and trivalent or tetravalent plutonium may be substituted for the compositions extracted in these examples. Likewise, other equivalent water-immiscible organic solvents may be substituted for the diethyl ether and methyl isobutyl ketone employed in the examples, and the specific procedures employed may be modified in numerous respects within the scope of the foregoing description.

A further aspect of the present invention relates to the separation of plutonium from aqueous solutions, and especially from aqueous solutions containing plutonium together with other contaminating elements, such as solutions derived from neutron irradiated uranium or deuteron irradiated uranium.

An object of this phase of the invention is to provide precipitation methods for the separation of plutonium from aqueous solutions containing ionic plutonium.

Another object of this aspect of the present invention is to provide suitable precipitation methods for separating plutonium from aqueous solutions containing plutonium and uranium fission products, and for simultaneously effecting at least partial decontamination of the plutonium with respect to said uranium fission products.

A further object is to provide carrier precipitation procedures for separating plutonium from aqueous solutions containing plutonium in concentrations below the solubility concentration of its most insoluble compound.

An additional object is to provide suitable carrier precipitation methods for separating plutonium with simultaneous decontamination, from aqueous solutions containing plutonium in very low concentrations and containing contaminating elements in concentrations at least as high as for plutonium concentration.

Other objects and advantages of this phase of the present invention will be apparent from the following description.

Aqueous solutions derived from neutron irradiated uranium or deuteron irradiated uranium may contain, in addition to plutonium, numerous contaminating elements in concentrations relatively high with respect to the plutonium concentration. Even after preliminary separation of unconverted uranium by solvent extraction, or by chemical means, such solutions may contain uranium in a concentration considerably exceeding the plutonium concentration. Solutions derived from unaged irradiated material may also contain neptunium in substantial concentration. The contaminating elements presenting the greatest difficulties in the recovery of plutonium comprise the uranium fission products.

When natural uranium is subjected to bombardment with neutrons or deuterons, nuclear fission takes place simultaneously with the formation of transuranic elements. Nuclear fission constitutes a breakdown of the heavy nucleus into lighter fragments which are generally very unstable and highly radioactive. Such fragments usually undergo beta-particle disintegration in successive steps, leading ultimately to stable isotopes of higher nuclear charge than the original fragments. In the case of a neutronic reactor operating with a self-sustaining chain reaction, the number of uranium nuclei undergoing fission is roughly equivalent to the number undergoing reaction to form transuranic elements. Since the fission products are at least twice the number of nuclei undergoing fission, aged material from a chain reaction will contain a greater number of atoms of fission products than of plutonium.

Although some fissions of $U^{238}$ and $U^{235}$ is caused by neutrons having energies above about 1,000,000 electron volts (1 m.e.v.), by far the greatest proportion of fission products formed in a neutronic reactor are due to the action of thermal neutrons on $U^{235}$. The fission of $U^{235}$ is predominantly binary, and may be exemplified by the following type of equation:

$$U^{235} + {}_0n^1 \rightarrow Kr^{92} + Ba^{141} + 3{}_0n^1 + 175 \text{ m.e.v.}$$

Substantially all of the fission fragments have mass numbers within the range 77–158, although small quantities of isotopes of lower and higher mass numbers may result from unbalanced binary fissions, ternary fissions or other reactions of infrequent occurrence. A large majority of the fission fragments comprise a light group of mass numbers 84–106 and a heavy group of mass numbers 128–150.

The various decay products of the initial fission fragments are referred to herein as fission products. These fission products fall within a range of atomic numbers from about 32 to about 64. The fission products from the light group of fragments have atomic numbers ranging from about 35 to about 46; and the fission products from the heavy group of fragments have atomic numbers ranging from about 51 to about 60.

The various radioactive fission products have half-lives ranging from a fraction of a second to thousands of years. Those having very short half-lives may be eliminated by aging the material for a reasonable period before handling. Those with very long half-lives do not have sufficiently intense radiation to endanger personnel protected by moderate shielding. On the other hand, the fission products having half-lives ranging from a few days to a few years have dangerously intense radiations which cannot be eliminated by aging for practical storage periods. These products are chiefly radioactive isotopes of Sr, Y, Zr, Cb, Ma, Ru and Rh of the light group and Te, I, Cs, Ba, La, Ce and Pr of the heavy group.

One method of recovering plutonium from compositions containing any of the contaminating elements discussed above is to form an aqueous solution having a plutonium concentration sufficient to permit the precipitation of an insoluble plutonium compound. The recovery of plutonium as an insoluble precipitate is particularly applicable to solutions in which any contaminating cations do not form insoluble compounds with the anion to be employed for the precipitation of the plutonium. By proper choice of anions and repeated reprecipitations, plutonium of a high degree of purity may be recovered by this method.

The suitability of various anions for the precipitation of insoluble plutonium compounds will depend on the oxidation state of the plutonium and on the nature of the aqueous solvent from which the precipitation is to be made. We have found that the anions which are suitable for the precipitation of an insoluble compound of trivalent or tetravalent plutonium from any solution suitably comprise the anions which may be used to precipitate an insoluble compound of trivalent or tetravalent cerium from the same solvent. In the same manner that the solubility of the lower valence states of plutonium parallels that of cerium, the solubility of hexavalent plutonium corresponds to that of hexavalent uranium.

The following plutonium compounds are insoluble in water, the term "insoluble" being used to designate solubilities of less than 0.01 mol per liter:

Trivalent plutonium:
 Fluoride
 Orthophosphate
 Oxalate
 Hydroxide (basic nitrates, sulfates, chlorides, etc.)
Tetravalent plutonium:
 Fluoride
 Double Fluorides ($KPuF_5$, $K_2PuF_6$, $La_2PuF_{10}$, etc.)
 Oxalate
 Iodate
 Orthophosphate
 Hydroxide (basic nitrates, sulfates, chlorides, etc.)
 Peroxide (basic peroxidic nitrates, sulfates, chlorides, etc.)
Hexavalent plutonium:
 Hydroxide (basic nitrates, sulfates, chlorides, etc.)

It is generally desirable to precipitate plutonium compounds from acidic aqueous solutions, and especially from aqueous inorganic acid solutions. Representative solubilities of trivalent and tetravalent plutonium compounds in solutions of various acids and of various acid concentrations are given in the following table:

TABLE 6

| Compound | Aqueous Solvent | Solubility (mg. Pu/liter) |
|---|---|---|
| Trivalent plutonium: | | |
| Fluoride | 1.0 M. HF+0.5 M. HCl | 69 |
| Do | 1.0 M. HF+1.0 M. HCl | 49 |
| Do | 1.0 M. HF+2.0 M. HCl | 37 |
| Oxalate | 0.2 M. $C_2H_4O_2$+0.20 M. $NaC_2H_3O_2$ | 25 |
| Orthophosphate | 0.6 M. $H_3PO_4$+0.15 M. $HNO_3$ | 7 |
| Do | 0.6 M. $H_3PO_4$+1.0 M. $HNO_3$ | 28 |
| Do | 0.8 M. $H_3PO_4$+0.10 M. HCl | 20 |
| Do | 0.8 M. $H_3PO_4$+0.25 M. HCl | 66 |
| Do | 0.8 M. $H_3PO_4$+0.50 M. HCl | 210 |
| Do | 0.8 M. $H_3PO_4$+0.10 M. $H_2SO_4$ | 23 |
| Do | 0.8 M. $H_3PO_4$+0.30 M. $H_2SO_4$ | 120 |
| Do | 0.8 M. $H_3PO_4$+0.40 M. $H_2SO_4$ | 900 |
| Tetravalent plutonium: | | |
| Fluoride | 0.1–2.0 M. $HNO_3$+0.5–2.0 M. HF | 350–700 |
| Potassium double fluoride | 0.5–2.0 M. $HNO_3$+0.5–2.0 M. HF | 10–50 |
| Lanthanum double fluoride | 0.5–2.0 M. $HNO_3$+0.5–2.0 M. HF | 20–70 |
| Iodate | 1.0 M. $HIO_3$ | 24 |
| Do | 5.0 M. $HIO_3$ | 84 |
| Do | 1.0 M. $H_2SO_4$ | 73 |
| Do | 5.0 M. $H_2SO_4$ | 103 |
| Do | 0.1 M. $KIO_3$+1.0 M. $HNO_3$ | 4 |
| Do | 0.1 M. $KIO_3$+3.0 M. $HNO_3$ | 7 |
| Do | 0.1 M. $KIO_3$+4.0 M. $HNO_3$ | 14 |
| Do | 0.1 M. $KIO_3$+5.0 M. $HNO_3$ | 47 |
| Do | 0.1 M. $KIO_3$+6.0 M. $HNO_3$ | 95 |
| Oxalate | 0.05 M. $H_2C_2O_4$+0.10 M. $HNO_3$ | 32 |
| Do | 0.05 M. $H_2C_2O_4$+0.50 M. $HNO_3$ | 15 |
| Do | 0.05 M. $H_2C_2O_4$+1.0 M. $HNO_3$ | 11 |
| Do | 0.10 M. $H_2C_2O_4$+0.10 M. $HNO_3$ | 175 |
| Do | 0.10 M. $H_2C_2O_4$+0.50 M. $HNO_3$ | 48 |
| Do | 0.10 M. $H_2C_2O_4$+1.0 M. $HNO_3$ | 25 |
| Do | 0.10 M. $H_2C_2O_4$+2.0 M. $HNO_3$ | 14 |
| Orthophosphate | 1.0 M. $HNO_3$ | 25 |
| Do | 1.0 M. $NaH_2PO_4$ | 20 |
| Do | 5.0 M. $NaH_2PO_4$ | 29 |
| Do | 0.1 M. $H_3PO_4$+0.1 M. $HNO_3$ | .1 |
| Do | 0.1 M. $H_3PO_4$+0.5 M. $HNO_3$ | 2 |
| Do | 0.1 M. $H_3PO_4$+1.0 M. $HNO_3$ | 5 |
| Do | 0.1 M. $H_3PO_4$+2.0 M. $HNO_3$ | 23 |
| Do | 0.1 M. $H_3PO_4$+0.1 M. $H_2SO_4$ | 4 |
| Do | 0.1 M. $H_3PO_4$+0.5 M. $H_2SO_4$ | 63 |
| Do | 0.1 M. $H_3PO_4$+1.0 M. $H_2SO_4$ | 550 |
| Do | 0.8 M. $H_3PO_4$+0.1 M. HCl | 12 |
| Do | 0.8 M. $H_3PO_4$+0.5 M. HCl | 16 |
| Do | 0.8 M. $H_3PO_4$+1.0 M. HCl | 29 |
| Do | 0.8 M. $H_3PO_4$+2.0 M. HCl | 72 |
| Peroxide (basic peroxidic nitrate) | 1.0 M. $HNO_3$+0.6% $H_2O_2$ | 710 |
| Do | 1.0 M. $HNO_3$+3.1% $H_2O_2$ | 70 |
| Do | 1.0 M. $HNO_3$+5.4% $H_2O_2$ | 50 |
| Do | 1.0 M. $HNO_3$+7.5% $H_2O_2$ | 20 |
| Hydroxide | 0.01 M. $Na_2SO_4$+$H_2SO_4$, pH 5.4 | 0.02 |
| Do | 0.01 M. $Na_2SO_4$+$H_2SO_4$, pH 4.1 | 0.2 |
| Do | 0.01 M. $Na_2SO_4$+$H_2SO_4$, pH 3.7 | 0.5 |
| Do | 0.01 M. $Na_2SO_4$+$H_2SO_4$, pH 3.0 | 1.2 |
| Do | 0.01 M. $Na_2SO_4$+$H_2SO_4$, pH 2.5 | 20.9 |
| Do | 1.0 M. $Na_2SO_4$+$H_2SO_4$, pH 6.3 | 1.1 |
| Do | 1.0 M. $Na_2SO_4$+$H_2SO_4$, pH 5.1 | 16 |
| Do | 1.0 M. $Na_2SO_4$+$H_2SO_4$, pH 4.2 | 217 |
| Do | 1.0 M. $Na_2SO_4$+$H_2SO_4$, pH 3.6 | 300 |
| Do | 1.0 M. $Na_2SO_4$+$H_2SO_4$, pH 3.2 | 355 |
| Do | 0.1 M. $NaClO_4$+$HClO_4$, pH 1.3 | 8.0 |
| Do | 0.1 M. $NaClO_4$+$HClO_4$, pH 1.6 | 4.2 |
| Do | 0.1 M. $NaClO_4$+$HClO_4$, pH 1.8 | 2.1 |
| Do | 0.1 M. $NaClO_4$+$HClO_4$, pH 2.2 | 1.0 |
| Do | 0.1 M. $NaClO_4$+$HClO_4$, pH 3.1 | 0.4 |
| Do | 0.1 M. $NaClO_4$+$HClO_4$, pH 4.1 | 0.3 |
| Do | 0.1 M. $NaClO_4$+$HClO_4$, pH 5.0 | 0.2 |

When precipitating an insoluble plutonium compound from a solution containing uranium fission products or other contaminating elements, substantial decontamination of the plutonium may be effected by the utilization of anions which form insoluble plutonium compounds but which form soluble compounds with one or more of the contaminating cations. The following are illustrative fission product cations which form soluble products (solubility in excess of 0.01 mol per liter) in 0.01 N.–N. nitric acid on the addition of various anions which precipitate tetravalent plutonium.

| Anion | Cations which form soluble compounds |
|---|---|
| Fluoride | Cs, Rb, Zr, $Cb^{+5}$, Ag. |
| Orthophosphate | Cs, Rb. |
| Iodate | Cs, Rb, La, $Ce^{+3}$ and other rare earths. |

It is often desirable to recover plutonium from very dilute solutions in which the plutonium concentration is below the solubility concentration of the most insoluble plutonium compound. Since the plutonium concentration in neutron irradiated uranium is generally substantially below 1% of the weight of the unreacted uranium, and may even be less than one part per million parts of uranium, solutions derived from such material will often contain plutonium in extremely low concentrations. The recovery of plutonium from such solutions, or from dilute waste solutions or the like, cannot usually be effected by a direct precipitation of an insoluble plutonium compound. If a dilute solution of plutonium contains substantial amounts of contaminating elements, concentration by evaporation will often result in a partial separation of impurities with an accompanying loss of plutonium. It is therefore desirable to effect the separation of plutonium directly from the dilute solution.

In order to separate plutonium from a solution of such low concentration that a plutonium compound will not precipitate by itself, it is necessary to employ an auxiliary insoluble "carrier" to effect removal of the plutonium from the solution. The insoluble carrier may be introduced into the solution as a pre-formed finely divided solid, but is preferably precipitated directly in the solution from which the plutonium is to be carried. The mechanism of the carrying of plutonium from solution is not fully understood, but it is believed to be effected in some cases by incorporation of plutonium ions into the carrier crystal lattice, in some cases by surface adsorption of plutonium ions, and in other cases by a combination of both.

The term "carrier" as used herein and in the appended claims is to be understood as signifying a substantially insoluble, solid, finely divided compound capable of ionizing to yield at least one inorganic cation and to yield at least one anion which constitutes an ionic component of a compound which contains the ion to be carried, said latter compound being not substantially more soluble than said finely divided compound in the same solution. The preferred carriers for trivalent plutonium comprise compounds having an anion which is capable of forming an insoluble compound of trivalent cerium in the same solution; and the preferred carriers for tetravalent plutonium comprise compounds having an anion which is capable of forming an insoluble compound of tetravalent cerium in the same solution.

A large number of carriers are available for carrying plutonium from solution in accordance with this phase of the present invention. The following are representative examples of useful carriers:

$LaF_3$              $Al(OH)_3$
$LaPO_4$             $Fe(OH)_3$
$La(OH)_3$           $ThF_4$
$La_2(C_2O_4)_3$     $Th(IO_3)_4$
$CeF_3$              $Th(C_2O_4)_2$
$CeF_4$              $ThO_4 \cdot xH_2O$
$CePO_4$             $ThO_x(NO_3)_y \cdot zH_2O$
$Ce(IO_3)_4$         $UO_4 \cdot xH_2O$
$Ce_3(PO_4)_4$       $Zr(OH)_4$
$SmF_3$              $ZrO(IO_3)_2$
$HfF_4$              $(ZrO)_3(PO_4)_2$ It will be apparent that the above compounds constitute plutonium carriers in accordance with the definition previously given. Thus, lanthanum fluoride is capable of ionizing to form a lanthanum cation and a fluoride anion. The latter is an ionic component of the insoluble compounds $PuF_4$ and $KPuF_5$. In an analogous manner, a basic peroxidic thorium nitrate is capable of ionizing to yield a $Th^{+4}$ cation and $NO_3-$ and $OOH-$ anions. The latter anions are ionic components of an insoluble basic peroxide plutonium nitrate.

The ratio of carrier to plutonium to be employed may vary over a wide range depending on the plutonium concentration of the original solution and upon the effectiveness of the particular carrier employed. Weight ratios ranging from 10,000/1 or higher to 10/1 or lower may be used, but the ratio will generally fall within the range 1000/1 to 100/1. If a low ratio of carrier to plutonium is desired, an isomorphic carrier is preferred, i.e. one having a crystalline structure with cation spacing in the crystal lattice such that plutonium ions may be substituted in the lattice for carrier cations.

It is apparent that different carriers will be required for the isomorphic carrying of plutonium in its different valence states. For plutonium in the +3 state, cerous and lanthanum compounds are suitable isomorphic carriers. Uranous, ceric, and thorium compounds are isomorphic carriers for plutonium in the +4 state, whereas uranyl compounds are isomorphic with plutonyl compounds (+6 plutonium). It is generally preferred to carry plutonium in the +4 state and for this purpose there may be employed, in addition to the isomorphic carriers listed above, other carriers of the same range of ionic radii. Desirable carriers for +4 plutonium comprise those having cations of ionic radii within the range 0.75– 0.97 A., as corrected in accordance with Zachariasen's method for determining corrected ionic radii (Zeit. für Kryst. 80, 137, 1932).

If plutonium is to be carried from a solution containing a large number of contaminating elements, it is possible that one or more of the contaminants may be isomorphic with the cations of certain of the plutonium carriers which could be employed. For maximum decontamination of plutonium in a single carrier precipitation, it is therefore, desirable to choose a carrier cation which is isomorphic with none, or with the least number, of the contaminating cations known to be present.

Even if there is no isomorphic carrying of contaminants simultaneously with the plutonium, some of the contaminating cations may be carried to some extent by absorption or by other mechanisms. If the contaminants in question are dangerously radioactive, such as are most of the uranium fission products with which plutonium is usually associated, it is desirable to minimize the carrying of such radioactivity with the plutonium. One method of reducing the amount of radioactivity carried by a carrier precipitate is to introduce into the solution a radioactively inert diluent or "hold-back carrier," which is an inactive isotope of the radioactive isotope which is to be held back in the supernatant solution during precipitation of the carrier. This method is particularly effective for reducing the carrying of radioactive isotopes which are carried by adsorption or other surface saturation type of carrying. Thus, inactive isotopes of the various uranium fission products which are not isomorphic with the carrier cation may be employed to improve the decontamination of plutonium when carrying it from solutions derived from neutron irradiated uranium.

The carrying procedure may be effected by any of the known techniques for effecting adequate contact of liquids with insoluble solids. In the case of preformed carriers, the finely divided solid may be agitated with the solution, or the solution may be continuously passed through fixed beds of the carrier. As previously pointed out, however, the preferred procedure is to precipitate the carrier directly in the plutonium solution. This may be effected by adding the ions in any order, but it is generally preferred to add the cation first, and then the anion. Mixed carriers may be precipitated, if desired, by precipitating two or more cations with the same anion, two or more anions with the same cation, or by coprecipitating carriers differing in both cation and anion.

When employing any of the above procedures it is desirable to provide an adequate contact time or digestion period to insure adequate carrying of the plutonium. This is particularly desirable in the case of isomorphic carrying or other internal carrying. The digestion may be effected at room temperature, but it is usually preferred to employ an elevated temperature ranging from about 30° C. to a temperature substantially below the boiling point of the solution. Temperatures of 40 to 60° C. will generally be satisfactory, with a contact time or precipitate digestion time of 10 to 90 minutes, and preferably 30 to 60 minutes. The carrier may then be separated from the supernatant solution by any suitable means, such as decantation, filtration or centrifugation.

The separation of plutonium from aqueous solutions by means of various carrier precipitates is further illustrated by the following specific examples:

*Example 7*

An 8.6 N. sulfuric acid solution was prepared containing lanthanum sulfate in a concentration of approximately 430 mg. per liter and plutonium in tracer concentration. To this solution was added about 2.1 times its volume of a saturated aqueous solution of sulfur dioxide, and the mixture was allowed to stand at room temperature for 25 minutes to effect reduction of any hexavalent plutonium. The sulfuric acid concentration of the resulting solution was about 2.8 N. and the lanthanum sulfate concentration was about 139 mg. per liter. About 27% by volume of 48% aqueous hydrofluoric acid was then added to the solution and the resulting lanthanum fluoride precipitate was separated by centrifuging. Analyses for alpha radiation showed that the precipitate contained 93% of the plutonium which was present in the original solution.

*Example 8*

A 0.07 N. sulfuric acid solution was prepared, containing cerous sulfate in a concentration of about 64 mg. per liter and tetravalent plutonium ion in tracer concentration. About 39% by volume of 48% aqueous hydrofluoric acid was then added and the resulting cerous fluoride precipitate was separated by centrifuging. Analyses for alpha radiation showed that the precipitate contained 92% of the plutonium which was present in the original solution.

*Example 9*

Lanthanum nitrate was added to a 1.0 N. $HNO_3$–0.1 M. $H_3PO_4$ solution containing tetravalent plutonium to produce a lanthanum ion concentration of approximately 0.15 g. per liter. The solution was then heated to 70° C. and was neutralized with sodium hydroxide until just alkaline to litmus. The resulting slurry was digested at room temperature for two hours, with agitation, and the lanthanum hydroxide precipitate was then separated by centrifuging. Radioactive analyses of the original solution and of the precipitate showed that 97% of the plutonium was carried by the lanthanum hydroxide.

*Example 10*

Thorium nitrate tetrahydrate was added to a 0.1 N. nitric acid solution containing tetravalent plutonium in tracer concentration to produce a thorium ion concentration of approximately 2 g. per liter. Hydrogen peroxide in the form of a 3% aqueous solution was then added in a concentration. Substantially in excess of the equivalent thorium concentration, and the resulting thorium peroxide precipitate (probably a basic peroxidic nitrate) was separated from the supernatant solution. Radioactive analyses of the original solution and of the final supernatant solution showed that 99% of the plutonium was carried by the thorium peroxide precipitate.

The use of a carrier precipitate to separate tetravalent plutonium from an aqueous solution, leaving hexavalent uranium in the supernatant liquid, is illustrated by the following example.

*Example 11*

Orthophosphoric acid was added to a nitric acid solution of uranyl nitrate containing lanthanum nitrate, zirconium nitrate, and tetravalent plutonium, to form a solution 3 N. with respect to nitric acid, 0.36 M. with respect to phosphoric acid, containing approximately 250 g. per liter of uranyl nitrate hexahydrate, and having a lanthanum ion concentration of 0.1 g. per liter and a zirconium ion concentration of 0.2 g. per liter. The resulting zirconium phosphate precipitate was separated from the supernatant solution, and both were subjected to analysis for total alpha radiation. The total alpha radiation in each case was corrected for uranium alpha radiation on the basis of another precipitation from a solution which contained no plutonium. The results showed approximately 99% carrying of plutonium by the zirconium phosphate precipitate with negligible carrying of uranium.

The use of a carrier precipitate to separate plutonium from an aqueous solution, leaving uranium fission products in the supernatant solution, is illustrated by the following example.

*Example 12*

To an aqueous sulfuric acid-nitric acid-sodium iodate solution containing tetravalent plutonium and beta-active fission products in tracer concentrations thorium ion was added in a concentration of about 17 mg. per liter. The mixture was heated for a short time at a temperature below the boiling point, cooled, allowed to stand at room temperature for one-half hour, and filtered to separate the thorium iodate precipitate. The filtrate was evaporated to about one-half its original volume and was then cooled and filtered to recover a second thorium iodate precipitate. Analyses for alpha and beta radiation showed that the combined thorium iodate precipitates contained all of the plutonium which was present in the original solution but only about 4% of the beta-active fission products.

The use of a carrier precipitate to separate plutonium from an aqueous solution, leaving neptunium in a higher oxidation state in the supernatant liquid, is illustrated by the following example.

*Example 13*

A 4.3 M. sulfuric acid solution was prepared, containing lanthanum sulfate in a concentration of approximately 430 mg. per liter and plutonium and neptunium in tracer concentrations. To this solution was added about 2.1 times its volume of an aqueous solution 0.2 M. with respect to bromate ion and 0.2 M. with respect to bromine. The resulting solution, which had a lanthanum sulfate concentration of about 139 mg. per liter, and was about 1.4 M. with respect to sulfuric acid, about 0.14 M. with respect to bromate ion, and about 0.14 M. with respect to bromine, was allowed to stand at room temperature for two hours to effect oxidation of the neptunium to the hexavalent state while leaving the plutonium in the tetravalent state. About 27% by volume of 48% aqueous hydrofluoric acid was then added to the solution, and the resulting lanthanum fluoride precipitate was separated by centrifuging. Analyses for alpha and beta radiation showed that the precipitate contained 99% of the plutonium which was present in the original solution, but only 0.74% of the neptunium.

The following example illustrates the use of a radioactively inert diluent or "hold-back carrier" to decrease the amount of a radioactive contaminant carried by a plutonium-carrying precipitate.

*Example 14*

A 1.0 N. $HNO_3$–0.5 N. HF solution was prepared, containing tracer concentrations of tetravalent plutonium and radioactive zirconium. Lanthanum nitrate hexahydrate was added to this solution in a concentration of approximately 390 mg. per liter. The resulting lanthanum fluoride precipitate was separated and subjected to radioactive analysis to determine its plutonium and zirconium content.

To a second portion of the $HNO_3$–HF solution of plutonium and radioactive zirconium, inactive zirconium was added in a concentration of 1 g. per liter to serve as a diluent or "held-back carrier." Lanthanum fluoride was then precipitated from the solution in the same concentration as before, and the precipitate was subjected to radioactive analysis to determine its content of plutonium and radioactive zirconium.

It was found that the lanthanum fluoride precipitate in each case contained approximately 98% of the original plutonium. The precipitate from the solution to which inactive zirconium had been added was found to contain only $\frac{1}{30}$ as much radioactive zirconium as the precipitate from the other solution.

The following example illustrates the direct precipitation of an insoluble plutonium compound, without a carrier, from a solution derived from a preceding carrier precipitate.

*Example 15*

A mixture of hydroxides comprising 88.2% by weight of lanthanum hydroxide, 9.9% plutonium hydroxide and 1.9% potassium hydroxide, was dissolved in 2.03 times its weight of 16 N. nitric acid. Approximately 3.22% by weight of concentrated sulfuric acid (sp. gr. 1.84) was added to the resulting solution, which was then diluted with water to form a solution 0.8 N. with respect to nitric acid and 0.2 N. with respect to sulfuric acid. The plutonium concentration of this solution was 8.25 g. per liter. The solution was heated to 60° C. and 50% by volume of 30% aqueous hydrogen peroxide was added over a period of one hour. The resulting slurry was digested for an additional hour at room temperature, after which the plutonium peroxide (probably a basic peroxidic sulfate) was separated by filtration. The precipitate was then dissolved in 16 N. nitric acid, sulfuric acid was added, and the solution diluted to 0.8 N. $HNO_3$–0.2 N. $H_2SO_4$. Plutonium peroxide was then reprecipitated and separated by filtration as before. The reprecipitated product, which was free from lanthanum, amounted to 99% of the plutonium originally present in the lanthanum hydroxide mixture.

It should be understood, of course, that the above examples are merely illustrative, and do not limit the scope of this phase of the present invention. Other plutonium carriers and hold-back carriers of the classes previously defined may be substituted for the particular carriers used in the examples, and the procedures employed may be varied in numerous respects within the scope of the foregoing description.

Another aspect of the present invention relates to further methods for the separation of plutonium from solutions thereof.

An object of this phase of the invention is to provide electrolytic means for the separation of plutonium from solution.

Another object of this aspect of the present invention is to provide suitable methods for the electrodeposition of plutonium from solutions in hydroxy solvents.

A further object is to provide means for simultaneously electrodepositing plutonium and a carrier therefor from dilute solutions of plutonium in aqueous or other hydroxy solvents.

Additional objects and advantages of this phase of the present invention will be apparent from the following description.

Plutonium is a strongly electropositive metal, not far below the alkali metals in the electromotive series, and it is therefore difficult to effect electrodeposition of metallic plutonium. We have found, however, that plutonium may readily be electrodeposited as an oxygenated compound by the electrolysis of suitable solutions of plutonium in hydroxy solvents. If the plutonium is present in solution in very low concentration, it may be electrodeposited simultaneously with the electrodeposition of a carrier. Electrodeposition may thus be used in place of or in conjunction with the precipitation methods or carrier precipitation methods for the separation of plutonium which have previously been described.

Solutions from which plutonium may be electrodeposited in accordance with the present invention preferably contain plutonium in the form of plutonyl ion, $PuO_2^{++}$, which may be reduced at the cathode to yield a hydrous oxide substantially insoluble under the conditions of electrolysis, or in the form of a cation which will hydrolyze to an insoluble compound in the layer of solution of low hydrogen ion concentration immediately adjacent to the cathode. All of the common inorganic salts of plutonium are readily hydrolyzable and may suitably be employed in the present process. The plutonium in the electrolyte may initially be in any of its valence states or in an equilibrium mixture of different valence states, and will be electrodeposited, either by anodic oxidation to $PuO_2^{++}$ with subsequent cathodic reduction, or by hydrolysis to a compound substantially insoluble in the solution of low hydrogen ion concentration in the immediate neighborhood of the cathode.

The solvent may suitably comprise any normally liquid hydroxy solvent, but is preferably an aqueous solvent or a lower aliphatic monohydric alcohol. Aqueous alcoholic solutions may be employed, if desired, but the alcohols are suitably used as anhydrous solvents. Anhydrous ethyl alcohol is the preferred solvent of the latter class.

When employing an anhydrous solvent, a desirably high conductivity may not be obtainable without providing an auxiliary solute. This is especially true in the case of a very dilute plutonium solution. In such instances, a convenient way to increase the conductivity of the solution, and also to facilitate the subsequent handling of the electrode deposit, is to incorporate into the solution a compound of a carrier element which will electrodeposit simultaneously with the plutonium. Such compound may suitably be any metal compound which is not substantially less hydrolyzable than the plutonium compound in the solution. The codeposition of plutonium and a carrier may be combined with preceding or following carrier precipitation processes by the choice of a suitable carrier cation which may be either precipitated or electrodeposited from the solutions in question.

Aqueous solutions for the electrodeposition of plutonium may suitably be acidified in order to provide adequate conductivity. If the desired plutonium concentration in the electrolyte exceeds the solubility concentration of plutonium hydroxide, or of a basic plutonium salt of one of the anions in the solution, the pH should be lowered in order to prevent precipitation of the plutonium. Inorganic acid solutions of about 0.1 N.–1.0 N. are generally satisfactory for this purpose. Considerably higher acid concentrations may cause the formation of negatively charged complex ions, with resulting anodic deposition. For deposition only at the cathode, it is preferred to employ solutions having acid concentrations not substantially greater than 1 N.

Plutonium may be codeposited with a carrier from aqueous solutions in accordance with the principles discussed above with reference to anhydrous solutions. From either type of solution of a hydrolyzable plutonium compound, plutonium will codeposit with an element which is present in the solution in the form of a compound which is not substantially less hydrolyzable than said plutonium compound. Conversely, the plutonium may be deposited with at least partial decontamination with respect to less easily hydrolyzable compounds of contaminating elements. Additional decontamination may be secured by a predeposition of metallic deposits of the less electropositive contaminants at potentials below the deposition potential for plutonium in the particular solution.

Any of the common expedients employed in the electrodeposition art may be applied to the electrodeposition of plutonium in accordance with the present invention. The electrodes may be constructed of any conducting material which is inert with respect to its surrounding electrolyte under the deposition operating conditions. Although carbon or other non-metallic electrodes may be used, metallic electrodes, and especially metallic electrodes having amorphous surfaces, are generally preferred. The electrodes may be of any suitable shape, and may be fixed, rotated, or otherwise moved in the electrolyte as desired.

The operating potential and electrode spacing should be correlated, in conformity to the conductivity of the particular solution employed, to produce as high a current density as is compatible with satisfactory plutonium deposition. With anhydrous solutions the current density may suitably range from 0.1 milliampere to 100 milliamperes or more per sq. cm. of cathode surface; and with aqueous solutions the current density may range from 1.0 milliampere to 1.0 ampere or more per sq. cm. of cathode surface.

The electrodeposition may be effected over a considerable range of temperature, from ordinary atmospheric temperatures to temperatures substantially below the boiling point of the solution employed. Temperatures of 10–60° C. will generally be satisfactory, but we usually prefer to effect the electrodeposition at a temperature of 20–30° C.

At the conclusion of the electrodeposition, the electrodes should, of course, be removed promptly from the electrolyte to prevent re-solution of the deposit or attack of the electrodes by the electrolyte. The plutonium deposit, or the codeposit of plutonium and carrier, may then be removed from its electrode by any suitable means, such as by scraping or other mechanical means, or by the use of an acid or other solvent to form a solution for further processing.

The following examples illustrate the separation of plutonium from aqueous and alcoholic solutions by electrodeposition:

Example 16

A solution of tetravalent plutonium nitrate in 0.1 N nitric acid, having a plutonium concentration of approximately 100 grams per liter, was electrolyzed for one-half hour between platinum electrodes with a current density of 372 milliamperes per sq. cm. of cathode surface.

Radioactive analyses of the cathode deposit and of the residual electrolyte indicated that approximately 50 percent of the plutonium was plated out in one-half hour. The deposit was an oxygenated compound, probably a hydrated oxide or a hydrated basic nitrate.

Example 17

A solution of lanthanum chloride in absolute alcohol, having a lanthanum chloride concentration of about 120 mg. per liter, and containing plutonium in tracer concentration, was electrolyzed for a period of one hour at a potential of 50 volts, utilizing a platinum anode and a silver cathode. The initial cathode current density was 1.0 milliampere per sq. cm. and the final current density was 0.3 milliampere per sq. cm. of cathode surface.

The lanthanum and plutonium plated out together on the cathode as oxygenated compounds, probably basic chlorides containing alcohol of solvation. Radioactive analysis of the plate and of the residual solution showed that all of the plutonium had been plated out.

It is to be understood, of course, that the above examples are only illustrative, and do not limit the scope of this phase of the present invention. Other solvents, plutonium compounds, and carriers may be substituted for the particular materials employed in the examples, and the electrolyzing conditions may be otherwise varied in numerous respects within the scope of the foregoing description.

A further aspect of the present invention relates to the separation of contaminating elements from plutonium and especially to the removal of radioactive uranium fission products from aqueous solutions of plutonium.

An object of this phase of the invention is to provide a suitable procedure for the separation of contaminating elements from aqueous solutions of plutonium while maintaining the plutonium in solution.

Another object of this phase of the present invention is to provide precipitation methods for the separation of uranium fission products from aqueous solutions containing plutonium and uranium fission products, while maintaining the plutonium in solution.

A further object is to provide combination precipitation methods whereby plutonium in aqueous solutions containing contaminating elements may be decontaminated by alternately precipitating contaminating elements while maintaining plutonium in solution and precipitating plutonium while maintaining contaminating elements in solution.

Other objects and advantages of this aspect of the present invention will be apparent from the following description.

When plutonium is removed from an aqueous solution by means of an insoluble carrier a certain proportion of the contaminating elements present in the solution will be carried along with the plutonium. If the separation is made by precipitation of a carrier from a solution containing large amounts of radioactive uranium fission products, the precipitate may readily be sufficiently radioactive as to require handling by remote control. Repeated re-dissolving and re-precipitating will result in further purification, and the decontamination can be still further improved by the use of hold-back carriers, as has previously been pointed out. The ultimate decontamination of plutonium by such a process, however, is tedious and expensive, and it is desirable to employ a more rapid and efficient method.

In accordance with the present invention, it has been found that relatively rapid decontamination may be effected by maintaining the plutonium in an aqueous solution in a non-carryable state, while contacting the solution with a carrier for one or more of the contaminating elements present in the solution. Preferably the plutonium is maintained in solution as an ion which forms a soluble compound with the anion of the carrier, whereas the carrier anion is capable of forming insoluble compounds with contaminating cations present in the solution.

In the preferred modification of this phase of the present invention, the plutonium is maintained in solution in the hexavalent state while precipitating a carrier for the contaminating cations. The carrier for this procedure may suitably comprise a carrier for trivalent or tetravalent plutonium, and such a carrier is highly advantageous when employed alternatively as a carrier for reduced plutonium and as a carrier for contaminants from a solution containing oxidized plutonium. In such a combination procedure, contaminants which were carried with reduced plutonium in one step of the process may be carried away from oxidized plutonium in a succeeding step employing the same carrier. Conversely, contaminants which would be carried with reduced plutonium on a given carrier may first be carried, on that carrier, away from oxidized plutonium.

The term "carrier," as used herein with reference to the carrying of contaminants, is employed in the same sense previously used with reference to the carrying of plutonium. In both cases a carrier may be considered to be a substantially insoluble, solid, finely divided compound capable of ionizing to yield at least one inorganic cation and to yield at least one anion which constitutes an ionic component of a compound which contains the ion to be carried, said latter compound being not substantially more soluble than said finely divided compound in the same solution. Taking lanthanum fluoride as an illustrative carrier, it may be seen that the fluoride anion constitutes an ionic component of a soluble compound of hexavalent plutonium, plutonyl fluoride, and an ionic component of insoluble compounds of various uranium fission products, e.g., fluorides of radioactive lanthanum and of yttrium, cerium, and other rare earths. Similarly, the phosphate anion of a zirconium phosphate carrier constitutes an ionic component of a soluble compound of hexavalent plutonium, plutonyl phosphate, and an ionic component of insoluble compounds of various uranium fission products, e.g., phosphates of radioactive zirconium and of strontium, yttrium, etc.

As has previously been pointed out, general decontamination may be effected by the use of any of the carriers which are suitable for carrying trivalent or tetravalent plutonium. Improved decontamination with respect to a specific contaminant however, may be effected by the choice of a carrier cation which is isotopic or isomorphic with the contaminating cation. In the case of a plurality of contaminants, such as the uranium fission products, a plurality of different carriers may be precipitated simultaneously or successively from the same solution of hexavalent plutonium. Such carriers may differ as to cation, as to anion, or as to both. When a plurality of carriers are precipitated simultaneously, a convenient method is to employ a plurality of cations which are precipitable by the same anion. Thus, the simultaneous precipitation of lanthanum fluoride (La$^{+3}$ ionic radius 1.06 A.) and ceric fluoride (Ce$^{+4}$ ionic radius 0.89 A.) will remove two different isomorphic series of contaminants.

In order to carry contaminants from aqueous solutions of plutonium, any plutonium which is present in a carryable state is first oxidized to a non-carryable state. This is suitably accomplished by oxidizing any +3 or +4 plutonium to the +6 state in accordance with methods which have previously been discussed in detail in describing another phase of the present invention. In order to maintain the plutonium in the hexavalent state during the contaminant carrying operation, an excess of oxidizing agent is generally incorporated in the solution. The resulting solution is then contacted with the carrier in accordance with any of the procedures which have previously been described with respect to the use of plutonium carriers. As in the case of plutonium carrying the preferred procedure is to precipitate the carrier in situ. The ions may be incorporated in the solution in any order, but the cation is usually added first, followed by an excess of the anion. After digestion of the precipitate for a short time at room temperature, or at a moderately elevated temperature, it is separated from the supernatant solution by any convenient method such as decantation, filtration, or centrifugation.

When using the preferred oxidation-reduction cycle of carrier precipitations, a contaminant carrier may be employed which is identical with the plutonium carrier, or which differs from the plutonium carrier as to cation, as to anion, or as to both. Alternatively, two or more contaminant carriers may be employed simultaneously or successively, one being the same as the plutonium carrier, or all being different from the plutonium carrier. It is generally most convenient to employ at least one carrier of the same chemical composition in both stages of the process. In such case, increased decontamination in the contaminant carrier step may be secured, if desired, by the use of a combination of a principal contaminant carrier of the same chemical composition as the plutonium carrier, together with smaller amounts of auxiliary contaminant carriers termed "scavengers." The auxiliary carriers may suitably be any carriers for the contaminants present in the solution which may be precipitated from the same solution from which the principal contaminant carrier is to be precipitated and which are not isomorphic with the principal contaminant carrier. When decontamination with respect to radioactive uranium fission products is desired, suitable "scavengers" comprise insoluble compounds of radioactively inert isotopes of the fission products. Such "scavengers" are conveniently co-precipitated with the principal contaminant carrier. The principal and auxiliary carriers may, however, be precipitated successively, in any order, from the oxidized plutonium solution.

The two stages of the oxidation-reduction carrier cycle may be carried out in any order, i.e., the first carrying may be effected from an oxidized plutonium solution or from a reduced plutonium solution as desired. If the first carrier is precipitated from an oxidized plutonium solution, the precipitate is separated and discarded, and the plutonium in the supernatant solution is then reduced to a carryable state by any of the methods which have previously been described. The plutonium carrier is then precipitated in the resulting solution. If excess anion was employed in precipitating the preceding contaminant carrier, and the same compound is to be precipitated as the plutonium carrier, this may be accomplished simply by adding the desired quantity of the carrier cation. The plutonium-carrying precipitate is then digested in the usual manner and separated from the supernatant solution. The precipitate is suitably redissolved in relatively strong mineral acid and the resulting solution is then diluted to the desired concentration for subsequent processing. The plutonium in this solution may be reoxidized, and another carrier precipitation may be effected for further removal of contaminants. This oxidation-reduction cycle may be repeated as often as necessary to obtain the desired decontamination, and the quantity of carrier may be reduced in successive stages to achieve simultaneous concentration of plutonium with respect to its carrier.

The following example illustrates decontamination by an oxidation-reduction carrier cycle:

*Example 18*

Plutonium was separated from the uranium and fission products contained in uranyl nitrate hexahydrate which had received 100 milliampere hours neutron bombardment. The uranyl nitrate had been stored for approximately four weeks after bombardment, and it contained a substantial amount of 94 Pu$^{239}$ but was practically free from 93 Np$^{239}$. The 94 Pu$^{239}$ was separated by the following procedure:

Approximately 1053 parts by weight of the bombarded uranyl nitrate hexahydrate described above, and approximately 30 parts by weight of thorium nitrate dodecahydrate, were dissolved in sufficient nitric acid to produce a solution 2 N with respect to nitric acid after the addition of 3186 parts by weight of a 0.35 M potassium iodate solution. Sufficient radioactive plutonium, 94 Pu$^{238}$, was incorporated as a tracer to give an $\alpha$ count of 10,000 per minute per ml. of the final mixture. The potassium iodate solution was then added, producing a solution having a uranium concentration of approximately 0.050 g. U per ml. This solution, containing the resulting thorium iodate precipitate, was allowed to stand for twenty minutes at room temperature.

The thorium iodate precipitate, containing the bulk of the plutonium, was then filtered off and washed with a solution 1.0 M with respect to nitric acid and 0.1 M with respect to potassium iodate. The washed precipitate was dissolved in 1188 parts by weight of 12 N hydrochloric acid, 2198 parts by weight of 0.5 M sodium dichromate solution was added, and the resulting solution was then diluted with water to a concentration 2.4 N with respect to hydrochloric acid and 0.1 M with respect to sodium dichromate. This solution was then digested for one-half hour at 65° C. to effect oxidation of the Pu$^{+4}$ to Pu$^{+6}$.

The Pu$^{+6}$ solution was then cooled to room temperature, after which 4248 parts by weight of 0.35 M potassium iodate solution was added, and the mixture was allowed to stand for twenty minutes at room temperature. The resulting thorium iodate precipitate, containing the bulk of the fission products, was filtered off and washed in the same manner as the first thorium iodate precipitate.

The distribution of the plutonium and fission products between the first thorium iodate precipitate, the first supernatant liquid, the second thorium iodate precipitate, and the second supernatant liquid, was determined by measurement of the $\alpha$, $\beta$, and $\gamma$ radiation emitted. For this purpose, blank determinations were first made on the original mixture, prior to the separation of the fist thorium iodate precipitate. The $\alpha$ count on this original mixture was taken to be that of the added 94 Pu$^{238}$. Aliquots were analyzed for total $\beta$ count, and for total $\beta$ count corrected for the UX$_1$ $\beta$ count, by means of Geiger-Mueller counters and well known techniques. Aliquots of the two thorium iodate precipitates and of the two supernatant liquids were then analyzed for $\beta$ and $\gamma$ activities in the same manner.

The plutonium content of the two thorium iodate precipitates and of the two supernatant liquids was recovered by an additional precipitation in each case, and the $\alpha$ activity of each of the precipitates was then determined. Since 95 Pu$^{238}$ and 94 Pu$^{239}$ have identical chemical properties, the distribution of 94 Pu$^{238}$, as indicated by the $\alpha$ counts, also represented the distribution of the 94 Pu$^{239}$.

The distribution of uranium, plutonium, and fission products obtained by the above separation procedure is shown in the following table:

TABLE 7

| Original substance | Method of determination | First Th(IO$_3$)$_4$ precipitate | First supernatant liquid | Second Th(IO$_3$)$_4$ precipitate | Second supernatant liquid |
|---|---|---|---|---|---|
| Uranium | Chemical | | 95 | | |
| Plutonium | Radiation | 98 | 2 | 0 | 92 |
| Fission products | {Gamma radiation | 18 | 82 | 21 | 4 |
| | Beta radiation | >11 | <89 | 11 | 0 |

The following example illustrates concentration of plutonium with respect to its carrier, as well as decontamination, in an oxidation-reduction carrier cycle:

Example 19

Lanthanum fluoride, carrying plutonium as the only alpha-active component, and carrying beta-active contaminants, was dissolved in a mixture of nitric and sulfuric acids. The solution was evaporated until fumes of sulfur trioxide were evolved and was then cooled and diluted with water to 30 times the volume of the fuming solution. A mixture of potassium peroxydisulfate and silver nitrate in a ratio of 20 to 1 was then added and the solution was digested for 15 minutes to effect oxidation of the plutonium to the hexavalent state. Hydrofluoric acid was then added in a concentration in excess of the equivalent concentration of lanthanum ion. After digestion for 5 minutes the lanthanum fluoride precipitate was separated by centrifuging.

The centrifugate was evaporated until fumes of sulfur trioxide were evolved, thus destroying the peroxydisulfate and effecting reduction of the plutonium to the tetravalent state, and the solution was then cooled and diluted with water. Lanthanum ion, an amount less than that in the preceding precipitate, together with an excess of hydrofluoric acid, were then introduced. The resulting lanthanum fluoride precipitate was separated by centrifuging, washed with dilute hydrofluoric acid, and dried.

The ratios of plutonium to lanthanum fluoride carrier in the initial material and in the final precipitate were determined on the basis of alpha radiation and weight of lanthanum. It was found that the ratio of plutonium to carrier in the final precipitate was 131% of the ratio in the initial material, whereas the ratio of beta contamination to carrier in the final precipitate was only 13% of the ratio in the initial material.

The following example illustrates an oxidation-reduction carrier cycle utilizing simultaneous precipitation of two contaminant carriers, one of which contains the same cation element as the plutonium carrier and the other of which differs from the plutonium carrier as to both cation and anion.

Example 20

A cerous fluoride precipitate carrying plutonium as the only alpha-active component, and carrying beta-active contaminants, was subjected to radioactive analysis for total alpha and beta radiation. The precipitate was dissolved in nitric and sulfuric acids, the solution evaporated to dryness, and the residue dissolved in aqueous nitric acid. An excess of potassium bromate was introduced and the bromate ion, catalyzed by cerium, oxidized the plutonium from the tetravalent to the hexavalent state. A substantial proportion of the cerous ion was simultaneously oxidized to ceric ion. Thorium ion and an excess of iodate ion were then introduced to precipitate mixed thorium and ceric iodates. This precipitate was separated by centrifuging and was dissolved and reprecipitated with additional thorium and iodate ions.

The centrifugates from the two iodate precipitates were combined and evaporated with concentrated hydrochloric acid. The resulting solution was cooled, and sulfur dioxide was introduced to reduce the hexavalent plutonium. Hydrofluoric acid was then added, and the resulting cerous fluoride precipitate was separated by centifuging, washed with dilute hydrofluoric acid, and dried.

Radioactive analysis of the iodate precipitates showed them to be inactive with respect to alpha radiation, thus indicating no by-product loss of plutonium. Analysis of the final plutonium-carrying cerous fluoride precipitate showed it to contain only one third of the beta radiation of the initial cerous fluoride precipitate.

The following example illustrates the separation of specific contaminants from a plutonium solution by means of a carrier precipitation:

Example 21

A lanthanum fluoride precipitate carrying plutonium as the only alpha-active component, and a second lanthanum fluoride precipitate containing no alpha-active component and carrying UX$_1$ and UY as the only beta-active components were subjected to radioactive analyses for alpha radiation and beta radiation.

The two precipitates were combined and dissolved in a mixture of nitric and sulfuric acids. The solution was evaporated until fumes of sulfur trioxide were evolved, and was then cooled and diluted with water to about 30 times the volume of the fuming solution. A mixture of potassium peroxydisulfate and silver nitrate, in a ratio of 20 to 1, was then added and the resulting solution was digested for 15 minutes to effect oxidation of the plutonium to the hexavalent state. Hydrofluoric acid was then added to the solution in a concentration in excess of the equivalent concentration of lanthanum ion. After digestion for five minutes, the lanthanum fluorine precipitate was separated by centrifuging, and was then washed with dilute hydrofluoric acid and dried.

The precipitate was subjected to radioactive analysis for alpha and beta radiation, and was found to contain at least 34.1 percent of the original UX$_1$ and UY but less than 0.34 percent of the original plutonium.

It is to be understood, of course, that the above examples are not to be construed as limiting the scope of this phase of the present invention. Other equivalent carriers and operating procedures may be substituted for the particular carriers and procedures of the examples, in accordance with the foregoing general description.

A further phase of the present invention relates to improved methods for the concentration and decontamination of plutonium, and particularly to methods employing a plurality of plutonium carriers of different chemical composition.

An object of this aspect of the invention is to provide a multi-stage multi-carrier process for the separation of plutonium from mixtures of plutonium and contaminating elements.

Another object of this phase of the invention is to provide a process for alternately carrying plutonium on carriers of different chemical composition, whereby the plutonium is concentrated with respect to its carrier.

A further object is to provide a process for the separation of plutonium from uranium fission products by a combination of plutonium carrier precipitations and fission product carrier precipitations, employing a plurality of plutonium carriers of different chemical composition, whereby the plutonium is decontaminated with respect to uranium fission products and concentrated with respect to its carrier.

Additional objects and advantages of this aspect of the present invention will be evident from the following description.

In accordance with one modification of this phase of the invention, plutonium is carried from an aqueous solution by means of a first plutonium carrier, the carrier and its associated plutonium are dissolved to form a second aqueous solution, and plutonium is separated from the second solution by means of a second carrier which differs in chemical composition from the first carrier. In such a process successive plutonium carriers may be chosen which are non-carriers for different contaminating elements, thus improving the decontamination over that obtainable from the successive use of the same plutonium carrier. Thus, in the decontamination of plutonium with respect to uranium fission products, the use of a plurality of non-isomorphic plutonium carriers will permit a plurality of different isomorphic series of fission products to be separated with the different supernatant solutions.

The alternate use of different plutonium carriers also facilitates the concentration of plutonium with respect to its carrier. The ratio of carrier to plutonium may be successively decreased in each cycle of the process. Each carrier may be dissolved in a smaller volume of solution than that required for the preceding carrier; and a solution may finally be obtained from which a plutonium compound may be precipitated without any carrier. Such concentration may be effected simultaneously with decontamination, as in the recovery of plutonium from solutions or precipitates containing uranium fission products. Alternatively, the concentration may be applied to previously decontaminated solutions or carrier precipitates, or for the recovery of plutonium from dilute waste solutions, or the like.

The successive carriers in the present process may differ in cations or in anions or in both, and the cations may differ as to their chemical elements or only with respect to the state of oxidation of the same element. In any case, however, the conditions for the precipitation of a subsequent carrier should be such that at least one of the ions of the preceding carrier remains in solution. Since reduction in carrier ratio in successive cycles is difficult in the case of common cations, or common cation elements, it is desirable to employ successive carriers having different cation metals, and we prefer to employ combinations of carriers which differ both in cations and in anions.

Although the carriers may be employed as pre-formed finely divided solids, it is preferable to precipitate the carrier in situ since the latter procedure usually permits a lower carrier ratio and results in more quantitative carrying of plutonium. Substantially the same techniques for carrier precipitation may be employed in our multiple carrier process as have previously been described for single carrier procedures. In general, it is desirable to incorporate the carrier cation in the solution, agitate while adding the carrier anion, and digest the resulting mixture prior to separating the precipitate.

Each precipitate is suitably dissolved in the minimum volume of solution from which the subsequent carrier may be precipitated substantially free from the preceding carrier. The use of different solvents in succeeding stages will facilitate volume reduction, but the same solvent may be used if the concentrations are suitably adjusted. We generally prefer to employ aqueous solvents and to modify their solvent power from stage to stage by adjustment of ionic concentrations. Thus, an aqueous solution of an inorganic acid or base may be used as the solvent in successive stages of our process and the pH may be adjusted to increase the solvent power from stage to stage. Also, precipitation of a carrier in the presence of a large excess of one of the carrier ions will permit redissolving in a smaller volume of the same solvent in the absence of such excess ion. Alternatively, an additional ion may be introduced to form a soluble complex with the cation of the preceding carrier. Other equivalent procedures for reducing the volume of solution from stage to stage and for precipitating a carrier free from preceding carrier will be evident to those skilled in the art.

The ratio of carrier to plutonium in the present process may vary over a wide range depending on the plutonium concentration of the original solution and upon the effectiveness of the particular carrier employed. Ratios ranging from 10,000/1 or higher in the first stage of the process to 10/1 or lower in the final stage may be used. However, the ratio will generally fall within the range 1,000/1 to 100/1.

After one or more carrier precipitations in accordance with the present concentration procedure, a final precipitation may be made with a sufficiently low ratio of carrier to plutonium so that the precipitate may be dissolved in a small volume of solution and a plutonium compound may then be precipitated directly without a carrier. If an isomorphic carrier is employed in the final carrier stage of the process, it will be necessary to change the valence state of the plutonium, or of the carrier cation, in the final solution in order to make a final precipitation of a pultonium compound free from carrier. On the other hand, if the final carrier is non-isomorphic with plutonium it will only be necessary to select conditions for the final precipitation of the plutonium compound such that at least the cation of the carrier remains in solution.

This modification of the present invention will be further illustrated by the following specific examples:

*Example 22*

A cerous fluoride precipitate carrying plutonium as the only alpha-active component, and carrying beta-active contaminants, was analyzed for plutonium content by measuring its alpha radiation with a proportional counter, and was analyzed for beta radiation by means of a calibrated electroscope.

The precipitate was dissolved in a mixture of nitric and sulfuric acids by heating. Thorium ion and an excess of iodate ion were introduced into the hot solution. Thorium iodate precipitated from the mixture on cooling and was separated by centrifuging. Additional thorium was introduced into the supernatant liquid, and the resulting second thorium iodate precipitate was separated by filtration. The filtrate was then evaporated to one-half its original volume and cooled to form a third thorium iodate precipitate which was then separated by filtration.

The three thorium iodate precipitates were analyzed for alpha and beta radiation, and it was found that they contained 100 percent of the original alpha radiation, and only 5 percent of the original beta radiation. This change to a carrier differing from the original carrier in both anion and cation was then accomplished with quantitative recovery of plutonium and with a 20 to 1 decontamination with respect to beta radiation.

*Example 23*

Orthophosphoric acid was added to a nitric acid solution of neutron bombarded uranyl nitrate hexahydrate containing lathanum nitrate and zirconium nitrate to form a solution 3 N with respect to nitric acid, 0.06 M with respect to phosphoric acid, containing approximately 114.5 g. of uranyl nitrate hexahydrate per liter, and having a lanthanum concentration of 0.03 g. per liter and a zirconium concentration of 0.1 g. per liter. The resulting zirconium phosphate precipitate was separated and washed with 3 N $HNO_3$–0.05 M $H_3PO_4$. The precipitate was then dissolved in concentrated nitric acid, lanthanum nitrate and concentrated hydrofluoric acid were introduced and sufficient water was added to form a solution 1.05 N with respect to nitric acid, 4.76 N with respect to hydrofluoric acid, and having a zirconium concentration of 0.066 g. per liter and a lanthanum concentration of 0.02 g. per liter. The resulting lanthanum fluoride precipitate was then separated from the supernatant solution and washed with dilute hydrofluoric acid.

The plutonium concentrations of the initial solution and of the final precipitate were determined by alpha radiation measurements and it was found that at least 86 percent of the initial plutonium was recovered in the final precipitate. The ratio of weight of plutonium to weight of carrier in the final precipitate was increased by a concentration factor of 6.6 over the ratio in the first carrier precipitate.

The degree of decontamination with respect to gamma-active uranium fission products was determined by measuring the total gamma radiation of the initial, intermediate, and final materials. The distribution of the gamma radiation was found to be as follows:

| Fraction: | Percent of total gamma radiation |
|---|---|
| Original solution | 100.0 |
| First supernatant solution | 64.3 |
| Final supernatant solution | 33.0 |
| Final precipitate | 2.7 |
| Total | 100.0 | tion in a concentration of about 90 mg. per liter, and excess aqueous hydrofluoric acid was added to precipitate lanthanum fluoride. The precipitate was then separated and washed with dilute aqueous hydrofluoric acid.

The recovery of plutonium through the above three stage carrier precipitation process was found to be 92 percent of that obtainable in a single stage process employing lanthanum fluoride as the carrier. The decontamination with respect to gamma-active uranium fission products obtained in the three stage process was determined by measuring the total gamma radiation of various fractions throughout the process. The distribution of the gamma radiation was found to be as follows:

| Fraction: | Percent of total gamma radiation |
|---|---|
| Original solution | 100.0 |
| First supernatant solution | 44.5 |
| Second supernatant solution | 8.5 |
| Final supernatant solution | 40.0 |
| Final precipitate | 7.0 |
| Total | 100.0 |

The above results illustrate the inefficiency of decontamination by repeated use of the same carrier as compared to the alternate use of carriers of different chemical composition.

Additional examples of suitable alternate carrier combinations are shown in the following table:

TABLE 8

| Preceding solution | Carrier precipitate | Subsequent solution | Subsequent carrier precipitate | Final solution |
|---|---|---|---|---|
| Aq. NH$_3$ | LaF$_3$ | Aq. NH$_3$ | (ZrO)$_3$(PO$_4$)$_2$ | Aq. HCl |
| Aq. HNO$_3$ | LaF$_3$ | Aq. HNO$_3$ | UO$_4$.xH$_2$O | Aq. HNO$_3$ |
| Aq. HNO$_3$ | LaPO$_4$ | Aq. HNO$_3$ | La(OH)$_3$ | Aq. HNO$_3$ |
| Aq. HNO$_3$ | LaPO$_4$ | Aq. HCl | U(IO$_3$)$_4$ | Aq. HCl |
| Aq. HCl | Le(C$_2$O$_4$) | Aq. HNO$_3$ | Ce(IO$_3$)$_4$ | Aq. HCl |
| Aq. HNO$_3$ | CeF$_3$ | Aq. ZrO(NO$_3$)$_2$ | ZrO(IO$_3$)$_2$ | Aq. HCl |
| Aq. HNO$_3$ | CePO$_4$ | Aq. HNO$_3$ | Th(IO$_3$)$_4$ | Aq. HCl |
| Aq. NaOH | Al(OH)$_3$ | Aq. NaOH | Zr(OH)$_4$ | Aq. HNO$_3$ |
| Aq. NaOH | Fe(OH)$_3$ | Aq. HNO$_3$ | LaF$_3$ | Aq. HNO$_3$ |
| Aq. NaOH | Cu(OH)$_2$ | Aq. NH$_4$OH | La(OH)$_3$ | Aq. HNO$_3$ |
| Aq. HNO$_3$ | UO$_4$.xH$_2$O | Aq. HNO$_3$* | LaF$_3$ | Aq. HNO$_3$ |
| Aq. HNO$_3$ | UO$_4$.xH$_2$O | Aq. HCl* | U(C$_2$O$_4$)$_2$ | Aq. HNO$_3$ |
| Aq. HNO$_3$ | (ZrO)$_3$(PO$_4$)$_2$ | Aq. HNO$_3$ | LaF$_3$ | Aq. HNO$_3$ |
| Aq. HNO$_3$ | (ZrO)$_3$(PO$_4$)$_2$ | Aq. HCl | U(C$_2$O$_4$)$_2$ | Aq. HNO$_3$ |
| Aq. HCl | Th(IO$_3$)$_4$ | Aq. HCl | ThF$_4$ | Aq. HNO$_3$ |

*Followed by reduction of PuO$_2^{+2}$ to Pu$^{+4}$.

Example 24

An aqueous solution, about 0.36 N with respect to hydrogen peroxide and about 0.45 N with respect to ammonium ion, was prepared from neutron irradiated uranyl nitrate hexahydrate. The uranium concentration was approximately 47.4 g. per liter (100 g. of hexahydrate per liter), and the solution contained La$^{+3}$, Ba$^{+2}$, and ZrO$^{+2}$ as "hold-back carriers" in concentrations of 0.2 g. per liter. The pH of the solution was adjusted to 2.6 by means of ammonium hydroxide, and the resulting uranium peroxide precipitate (probably a basic peroxidic uranium nitrate) was separated from the supernatant solution and washed with dilute aqueous hydrogen peroxide.

The precipitate was then dissolved in concentrated nitric acid, and the resulting solution was partially neutralized with ammonium hydroxide and diluted with water to form a solution having a uranium concentration of 47.4 g. per liter and a pH of 2.6. The resulting precipitate was separated from the supernatant solution, and dissolved in concentrated nitric acid.

The concentrated nitric acid solution was diluted to a nitric acid concentration of about 0.6 N and a uranium concentration of about 50.7 g. per liter. Lanthanum nitrate hexahydrate was then incorporated in the solu- The decontamination obtainable in the alternate carrier process described above may be substantially improved by the use of one or more contaminant carrying steps between successive plutonium carrying steps of the cycle. Thus, in decontaminating plutonium with respect to uranium fission products, a plutonium carrier is suitably precipitated from a dilute solution of plutonium and fission products; the precipitate is redissolved to form a second solution; at least one fission product carrier is precipitated and separated from this solution; and a second plutonium carrier, differing in chemical composition from the first plutonium carrier, is then precipitated and separated from the solution. Simultaneous concentration of plutonium may be secured in this process in the same manner as in the process employing no intervening contaminant carriers, i.e. by successively reducing carrier ratios and solution volumes.

In this modification of the present process, the intervening fission product carriers may be the same as one or both of the plutonium carriers, or may be chemically distinct from both of the plutonium carriers. From the standpoint of decontamination, it is generally desirable to follow a plutonium carrier with the same carrier, or one isomorphic therewith, as a fission product carrier.

Conversely, more complete decontamination may be secured in the final plutonium-carrying precipitation of the cycle if the plutonium carrier is isomorphic with the plutonium compound to be carried but is not isomorphic with the preceding fission product carrier. However, if two intervening fission product carriers are employed, it is generally more convenient to use the same carriers as the preceding and subsequent plutonium carriers.

In order to employ the same compound successively as a plutonium carrier and as a fission product carrier, conditions must be employed which prevent the carrying of plutonium in the fission-product-carrying precipitation. This may conveniently be accomplished by changing the state of oxidation of the plutonium in the manner previously described for oxidation-reduction cycles with a single plutonium carrier.

In the preferred process of this phase of the present invention, the plutonium is carried in the +4 valence state and is maintained in solution in the +6 valence state while carrying fission products. In accordance with one modification of this process, an operating cycle comprises the precipitation of a carrier for +4 plutonium, solution of the precipitate, oxidation of the plutonium to the +6 state, precipitation of a fission product carrier which may be the same as, or different from, the preceding plutonium carrier, reduction of the plutonium to the +4 state, precipitation of a second plutonium carrier chemically distinct from the first plutonium carrier, and solution of the second precipitate to form a smaller volume of solution than that resulting from the dissolution of the first precipitate.

This modification of the present invention will be further illustrated by the following specific example.

*Example 25*

A thorium iodate precipitate carrying plutonium as the only alpha-active component, and carrying beta-active fission products, was dissolved in concentrated hydrochloric acid. Concentrated sulfuric acid was added and the solution was evaporated until sulfur trioxide fumes were evolved. Concentrated nitric acid was then added and the solution was again evaporated until sulfur trioxide was evolved. The resulting solution which had a thorium concentration of about 1 g. per liter, was diluted with about 30 times its volume of water, and potassium peroxydisulfate and a trace of silver nitrate were added, together with lanthanum ion to a concentration of about 32 mg. per liter. The solution was then warmed and digested for one-half hour to effect oxidation of the plutonium to the hexavalent state. Hydrofluoric acid in excess of the equivalent lanthanum concentration was then added and the resulting lanthanum fluoride precipitate, with its associated fission products, was separated by centrifuging.

The centrifugate was heated for one hour below the boiling point and was then evaporated until sulfur trioxide fumes were evolved thus effecting reduction of the hexavalent plutonium. The resulting solution was cooled and diluted with water, and lanthanum ion was introduced in an amount equal to that employed in the preceding precipitation. Hydrofluoric acid in excess of the equivalent lanthanum concentration was then added, and the lanthanum fluoride precipitate, with its associated plutonium was separated by centrifuging.

Radioactive analyses of the initial and subsequent precipitates showed that the lanthanum fluoride precipitate from the oxidized plutonium solution contained less than 3 percent of the plutonium which was present in the initial thorium iodate precipitate, whereas the final plutonium-carrying lanthanum fluoride precipitate contained less than 14 percent of the beta-active fission products which were present in the original thorium iodate precipitate.

Additional carrier combinations which are suitable for a cycle including a single fission product carrier precipitation between precipitations of different plutonium carriers are set forth in Table 9:

TABLE 9

| Preceding solution | First plutonium carrier precipitate | Metathesizing agent | Subsequent solution | Oxidizing agent |
|---|---|---|---|---|
| Aq. $HNO_3$ | $LaF_3$ | NaOH | Aq. $HNO_3$ | $KMnO_4$ |
| Aq. HCl | $LaF_3$ | NaOH | Aq. HCl | $K_2Cr_2O_7$ |
| Aq. $HNO_3$ | $LaF_3$ | | Aq. $HNO_3$ | $Ce(NO_3)_4$ |
| Aq. $HNO_3$ | $LaF_3$ | NaOH | Aq. $HNO_3$ | $K_2Cr_2O_7$ |
| Aq. $HNO_3$ | $LaF_3$ | | Aq. $HNO_3$ | $K_2S_2O_8$+$AgNO_3$ |
| Aq. HCl | $LaPO_4$ | | Aq. $HNO_3$ | $K_2Cr_2O_7$ |
| Aq. $HNO_3$ | $LaPO_4$ | $H_2C_2O_4$ | Aq. $(NH_4)_2C_2O_4$ | |
| Aq. $HNO_3$ | $CeF_3$ | | Aq. $HNO_3$ | $Ce(NO_3)_4$ |
| Aq. HCl | $CeF_3$ | NaOH | Aq. $HNO_3$ | $K_2Cr_2O_7$ |
| Aq. $HNO_3$ | $CePO_4$ | | Aq. $HNO_3$ | $KMnO_4$ |
| Aq. $HNO_3$ | $Th(C_2O_4)_2$ | | Aq. $HNO_3$+$K_2Cr_2O_7$ | $K_2Cr_2O_7$ |
| Aq. $HNO_3$ | $ThF_4$ | NaOH | Aq. $HNO_3$ | $K_2S_2O_8$+$AgNO_3$ |
| Aq. HCl | $U(C_2O_4)_2$ | | Aq. $HNO_3$+$K_2Cr_2O_7$ | $K_2Cr_2O_7$ |
| Aq. $HNO_3$ | $(ZrO)_3(PO_4)_2$ | | Aq. $HNO_3$+HF | $K_2Cr_2O$ |
| Aq. $HNO_3$ | $(ZrO)_3(PO_4)_2$ | NaOH | Aq. $HNO_3$ | $K_2S_2O_8$+$AgNO_3$ |

| Preceding solution | Fission product carrier precipitate | Reducing agent | Second plutonium carrier precipitate | Metathesizing agent | Final solution |
|---|---|---|---|---|---|
| Aq. $HNO_3$ | $(ZrO)_3(PO_4)_2$ | $H_2O_2$ | $(ZrO)_3(PO_4)_2$ | | Aq. $HNO_3$ |
| Aq. HCl | $LaF_3$ | $H_2C_2O_4$ | $U(C_2O_4)_2$ | | Aq. $HNO_3$ |
| Aq. $HNO_3$ | $LaF_3$+$CeF_4$ | $SO_2$ | $CeF_3$ | NaOH | Aq. HCl |
| Aq. $HNO_3$ | $La_2(C_2O_4)_3$ | | $La(OH)_3$ | | Aq. $HNO_3$ |
| Aq. $HNO_3$ | $LaF_3$ | $H_2O_2$ | $ThO_4 \cdot xH_2O$ | | Aq. HCl |
| Aq. HCl | $Th(IO_3)_4$ | $H_2O_2$ | $Th(IO_3)_4$ | | Aq. HCl |
| Aq. $HNO_3$ | $La_2(C_2O_4)_3$ | | $La(OH)_3$ | | Aq. $HNO_3$ |
| Aq. $HNO_3$ | $Ce(IO_3)_4$ | $NaNO_2$ | $Ce(IO_3)_4$ | | Aq. HCl |
| Aq. HCl | $CeF_4$ | | $UO_4 \cdot xH_2O$ | | Aq. HCl |
| Aq. $HNO_3$ | $CeF_4$ | $H_2O_2$ | $LaF_3$ | NaOH | Aq. $HNO_3$ |
| Aq. $HNO_3$ | $ThF_4$ | $H_2C_2O_4$ | $La_2(C_2O_4)_3$ | | Aq. $HNO_3$ |
| Aq. $HNO_3$ | $ThF_4$ | $H_2O_2$ | $(ZrO)_3(PO_4)_2$ | | Aq. $HNO_3$ |
| Aq. HCl | $Ce_3(PO_4)_4$ | $SO_2$ | $ThF_4$ | NaOH | Aq. HCl |
| Aq. $HNO_3$ | $LaF_3$ | $H_2O_2$ | $LaF_3$ | NaOH | Aq. $HNO_3$ |
| Aq. $HNO_3$ | $(ZrO)_3(PO_4)_2$ | $SO_2$ | $Th(IO_3)_4$ | | Aq. HCl |

In the preferred modification of this phase of the present invention two or more fission product carriers of different chemical composition are employed between the first and second plutonium carriers of the cycle. In this manner maximum decontamination as well as maximum concentration may be accomplished in a single cycle of the process. Suitable carrier combinations for two fission product carrier precipitations between the first and second plutonium carrier precipitations of a cycle are set forth in Table 10:

tion of a suitable peroxide, preferably hydrogen peroxide. The resulting hydrated precipitates are commonly mixtures

TABLE 10

| Preceding solution | First plutonium carrier precipitate | Metathesizing agent | Subsequent solution | Oxidizing agent | First fission product carrier precipitate |
|---|---|---|---|---|---|
| Aq. HNO₃ | LaF₃ | NaOH | Aq. HNO₃ | KMnO₄ | LaF₃ |
| Aq. HCl | LaF₃ | NaOH | Aq. HCl | Ce(NO₃)₄ | LaF₃ |
| Aq. HNO₃ | LaF₃ | | Aq. HNO₃ | K₂S₂O₈+AgNO₃ | LaF₃ |
| Aq. HNO₃ | LaPO₄ | (NH₄)₂C₂O₄ | Aq. (NH₄)₂C₂O₄ | | La₂(C₂O₄)₃ |
| Aq. HCl | LaPO₄ | | Aq. HNO₃ | K₂Cr₂O₇ | LaPO₄ |
| Aq. HNO₃ | CePO₄ | NaOH | Aq. HNO₃ | K₂Cr₂O₇ | CeF₄ |
| Aq. HNO₃ | CePO₄ | | Aq. HNO₃ | K₂Cr₂O₇ | Ce₃(PO₄)₄ |
| Aq. HCl | Ce₂(C₂O₄)₃ | | Aq. HNO₃+K₂Cr₂O₇ | K₂Cr₂O₇ | Ce₃(PO₄)₄ |
| Aq. HCl | Th(IO₃)₄ | | Aq. HCl | K₂Cr₂O₇ | Th(IO₃)₄ |
| Aq. HCl | Th(IO₃)₄ | | Aq. HCl | K₂Cr₂O₇ | Th(IO₃)₄ |
| Aq. HNO₃ | ThF₄ | NaOH | Aq. HCl | K₂S₂O₈+AgNO₃ | ThF₄ |
| Aq. HCl | U(C₂O₄)₂ | | Aq. HNO₃+K₂Cr₂O₇ | K₂Cr₂O₇ | (ZrO)₃(PO₄)₂ |
| Aq. HNO₃ | (ZrO)₃(PO₄)₂ | | Aq. HNO₃ | KMnO₄ | (ZrO)₃(PO₄)₂ |
| Aq. HCl | ZrO(IO₃)₂ | | Aq. HCl | K₂Cr₂O₇ | ZrO(IO₃)₂ |
| Aq. HCl | ZrO(IO₃)₂ | | Aq. HNO₃+HF | K₂S₂O₈+AgNO₃ | LaF₃ |

| Preceding solution | Second fission product carrier precipitate | Reducing agent | Second plutonium carrier precipitate | Metathesizing agent | Final solution |
|---|---|---|---|---|---|
| Aq. HNO₃ | (ZrO)₃(PO₄)₂ | H₂O₂ | (ZrO)₃(PO₄)₂ | | Aq. HNO₃ |
| Aq. HCl | CeF₄ | H₂C₂O₄ | Ce₂(C₂O₄)₃ | | Aq. HNO₃ |
| Aq. HNO₃ | ThF₄ | H₂O₂ | ThO₄·xH₂O | | Aq. HCl |
| Aq. HNO₃ | SrC₂O₄ | | La(OH)₃ | | Aq. HNO₃ |
| Aq. HCl | Th(IO₃)₄ | H₂O₂ | Th(IO₃)₄ | | Aq. HCl |
| Aq. HNO₃ | Ce(IO₃)₄ | SO₂ | UO₄·xH₂O | | Aq. HNO₃ |
| Aq. HNO₃ | ThF₄ | SO₂ | ThF₄ | NaOH | Aq. HNO₃ |
| Aq. HCl | Th(IO₃)₄ | H₂C₂O₄ | Th(C₂O₄)₂ | | Aq. HCl |
| Aq. HCl | (ZrO)₃(PO₄)₂ | H₂C₂O₄ | La₂(C₂O₄)₃ | | Aq. HNO₃ |
| Aq. HCl | LaPO₄ | H₂O₂ | LaPO₄ | NaOH | Aq. HNO₃ |
| Aq. HNO₃ | Ce(IO₃)₄ | SO₂ | Ce(IO₃)₄ | | Aq. HCl |
| Aq. HCl | CeF₃ | SO₂ | CeF₃ | NaOH | Aq. HNO₃ |
| Aq. HNO₃ | LaF₃ | SO₂ | LaF₃ | NaOH | Aq. HNO₃ |
| Aq. HCl | CeF₃ | H₂O₂ | CeF₃ | | Aq. HNO₃ |
| Aq. HCl | LaPO₄ | H₂O₂ | UO₄·xH₂O | | Aq. HNO₃ |

It is to be understood, of course, that the above examples are not to be construed as limiting the scope of this phase of the present invention. Other equivalent carriers and operating procedures may be substituted for the particular carriers and procedures of the examples, in accordance with foregoing general description.

A further aspect of the present invention relates to new compositions of matter and methods of preparing same.

This phase of the invention contemplates all inorganic compositions of plutonium, and methods for their preparation.

An object of this aspect of the invention is to provide oxygenated plutonium compounds, particularly oxy, hydroxy, and peroxy compounds of plutonium, and suitable procedures for their preparation.

Another object is to provide plutonium salts of inorganic acids and methods for preparing such salts.

A further object is to provide elemental metallic plutonium and suitable methods for its production.

Additional objects of this phase of the present invention will be evident from the following description.

In the recovery of plutonium from neutron irradiated uranium by the decontamination and concentration procedures previously described, a precipitate may finally be obtained which consists of a single carrier and a substantially pure plutonium compound having the same anion as the carrier. Such a precipitate desirably has a low carrier-to-plutonium ratio, e.g. 100/1 or lower. When a precipitate of this character is dissolved in a minimum quantity of an aqueous inorganic acid, substantially pure oxygenated compounds of plutonium may be precipitated from the resulting solution.

The term "oxygenated compound of plutonium," as used herein and in the appended claims, signifies a compound having at least one oxygen atom directly bonded to a plutonium atom. Plutonium peroxide and the various basic peroxidic salts of tetravalent plutonium are examples of plutonium compounds having directly bound oxygen. These compounds may be precipitated from acidic solutions of tetravalent or hexavalent plutonium by the addition of a suitable peroxide, preferably hydrogen peroxide. The resulting hydrated precipitates are commonly mixtures of compounds having different ratios of oxy groups, peroxy groups, and acid anions, with the result that the over-all ratios are generally non-integral. Representative products of this class are shown below:

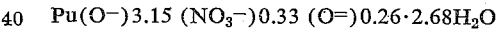
Pu(O⁻)3.15 (NO₃⁻)0.33 (O=)0.26·2.68H₂O
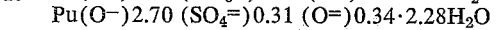
Pu(O⁻)2.70 (SO₄=)0.31 (O=)0.34·2.28H₂O
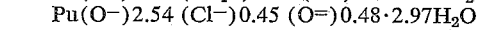
Pu(O⁻)2.54 (Cl⁻)0.45 (O=)0.48·2.97H₂O
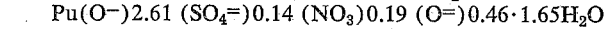
Pu(O⁻)2.61 (SO₄=)0.14 (NO₃)0.19 (O=)0.46·1.65H₂O Such products may contain hydrated compounds of the following types:

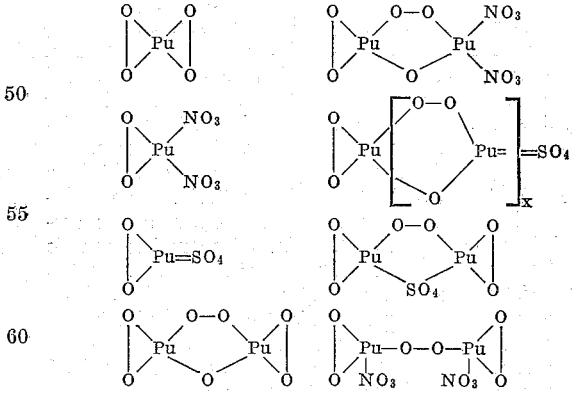

The following example illustrates the preparation of a basic peroxidic plutonium nitrate-sulfate:

*Example 26*

A lanthanum fluoride-plutonium fluoride precipitate containing about 25% by weight of plutonium tetrafluoride is fumed with concentrated sulfuric acid until no further hydrogen fluoride is evolved. The material is then dissolved in aqueous nitric acid to form a solution 1.0 N. with respect to nitric acid and 0.1 M. with respect to sulfuric acid, having a lanthanum concentration of about 37.1 g. per liter, and a plutonium concentration of about 13.2 g. per liter. Aqueous hydrogen peroxide (30% H₂O₂, by weight) is then added over a period of one hour, at 20° C., in an amount such that the final solution contains 10% $H_2O_2$ by weight. The slurry is then digested for one hour at 20° C. and filtered. The product thus obtained is a blue-green solid corresponding to an empirical formula $Pu(O^-)_v(NO_3)_w(SO_4)_x(O^=)_y \cdot zH_2O$. It is readily soluble in acids and is useful for the preparation of other plutonium compounds.

Plutonium hydroxides and the various basic salts of tetravalent plutonium are additional examples of plutonium compounds having directly bound oxygen. Compounds of this class may be precipitated by neutralizing acidic solutions of trivalent or tetravalent plutonium. The resulting products are obtained as hydrated precipitates comprising mixtures of different compounds such that the over-all ratio of hydroxide ion to acid anion is usually non-integral. Such mixtures may be represented by empirical formulas such as $Pu(OH)_x(NO_3)_y$ and $$Pu(OH)_x(SO_4)_y$$

If such precipitates are dried without washing, partial dehydration of the hydroxide, or transformation to a hydrated oxide structure may occur, and the mixtures may then be represented by empirical formulas such as
$PuO_2(NO_3)_x \cdot yH_2O$ and $PuO_2(SO_4)_x \cdot yH_2O$
where $x$ and $y$ may be but usually will not be integers. Such products derived from tetravalent plutonium may contain compounds of the following types:

| | |
|---|---|
| $PuO_2 \cdot xH_2O$ | $Pu(OH)_2SO_4$ |
| $Pu(OH)_2(NO_3)_2$ | $Pu(OH)_3SO_4Pu(OH)_3$ |
| $Pu(OH)_3NO_3$ | |

If an initial precipitate of the type described above is thoroughly washed or digested in alkali, substantially pure hydroxide is obtained. On drying the resulting hydroxide, even at moderately elevated temperatures, it is transformed at least partially to the hydrated oxide. The following example illustrates a suitable procedure for the prepartion of this compound:

Example 27

A basic peroxidic plutonium nitrate-sulfate precipitate, prepared as in Example 26, is dissolved in 16 N. nitric acid and diluted with water to form a solution having a nitric acid concentration of about 1.0 N. and a plutonium concentration of about 23 g. per liter. Aqueous ammonium hydroxide is then added slowly, with agitation. Precipitation starts at a pH of about 2.5 and is substantially complete at a pH of about 3.5. The precipitate is washed with 5 N. aqueous ammonium hydroxide until the wash solution shows no decrease in alkalinity, and is then thoroughly washed with water and dried in a vacuum at 70° C. The resulting material is an olive-green solid which corresponds, on analysis, to the empirical formula $PuO_2 \cdot xH_2O$. This compound is soluble in aqueous solutions having a pH of at least 7.0 to the extent of less than 2 mg. of plutonium per liter. It is readily soluble in strong acids and is useful for the preparation of other plutonium compounds.

The procedure of the above example may be modified by saturating the solution with sulfur dioxide prior to neutralizing with ammonium hydroxide. In such case the product obtained is the trivalent plutonium hydroxide. This compound is a blue solid which is readily soluble in acids and soluble in 5 N. ammonium hydroxide to the extent of about 0.09 g. of plutonium per liter. This compound, as well as the tetravalent hydroxide is particularly useful to the production of other plutonium compounds.

Ignition of the hydrated oxides of plutonium results in complete dehydration to the corresponding oxides. Partial dehydration takes place at temperatures only slightly above room temperature, but it is desirable to heat the material to a temperature in the range 500–1000° C. to effect complete dehydration. The following example illustrates the production of plutonium dioxide.

Example 28

Tetravalent plutonium hydroxide prepared as in Example 26, is ignited to constant weight in a muffle furnace at about 850° C. The resulting compound, $PuO_2$, is a crystalline solid appearing green by reflected light and yellow by transmitted light. It is soluble in strong mineral acids. The crystalline structure is face-centered cubic, with four molecules per unit cell and a lattice constant of 5.386±0.002 A. The calculated density is 11.44.

Plutonium dioxide may also be prepared by the ignition of the plutonium nitrates or the basic peroxidic plutonium nitrates at temperatures above 300° C., and preferably at a temperature in the range 500–1000° C.

The various soluble salts of plutonium may be prepared by dissolving plutonium hydroxide in the acid having the desired cation, adjusting the oxidation state of the plutonium in the resulting solution, and evaporating to crystallize out the desired compound. The insoluble salts may be prepared in a similar manner by dissolving plutonium hydroxide in an acid which forms a soluble salt, adjusting the oxidation state of the plutonium, incorporating the cation of the desired insoluble salt, and separating the resulting precipitate. The following examples illustrate the preparation of representative plutonium salts:

Example 29

Tetravalent plutonium hydroxide is dissolved in 16 N. nitric acid and the resulting solution is evaporated until the tetranitrate crystallizes out. The product is obtained as a highly hydrated lemon yellow crystalline material corresponding to the formula $Pu(NO_3)_4 \cdot xH_2O$. This compound is very soluble in water and in dilute acids. A concentration as high as 2.5 M. in 1.7 N. nitric acid is obtainable, although this solution may be somewhat supersaturated at room temperature.

Example 30

Tetravalent plutonium hydroxide is dissolved in 16 N. nitric acid, diluted to 1 N. nitric acid, and heated to 75–100° C. until spectrophotometric analysis indicates complete oxidation of the plutonium to the hexavalent state. The solution is then cooled and concentrated by evaporation under high vacuum until plutonyl nitrate crystallizes out. The product is yellow to orange in color, with a pink tinge, and corresponds to the formula $$PuO_2(NO_3)_2 \cdot xH_2O$$

It is extremely soluble in water (ca. 500 g. Pu per liter). Treatment with various organic solvents results in solution of $PuO_2(NO_3)_2$ in the organic phase.

Example 31

Trivalent plutonium hydroxide is dissolved in concentrated hydrochloric acid and the resulting solution is evaporated in a stream of hydrogen chloride until $PuCl_3 \cdot 6H_2O$ crystallizes out as a blue solid. This compound is deliquescent and melts at 94–96° C. It may be dehydrated in vacuo (less than 1 mm. Hg pressure) at room temperature to the monohydrate, $PuCl_3 \cdot H_2O$. The monohydrate may be slowly transformed to anhydrous $PuCl_3$ at 70° C. in a high vacuum ($10^{-5}$ mm. $H_2O$ pressure). The anhydrous trichloride is more conveniently prepared, however, by heating the hexahydrate slowly to 250° C. in a stream of hydrogen chloride.

$PuCl_3$ is a blue-green colored solid which is readily soluble in water to form purple colored solutions. The solid is stable with respect to air oxidation at room temperature but is converted to $PuO_2$ on heating in air to 400° C. The crystalline structure of the trichloride is hexagonal with two molecules per unit cell. The lattice constants are $a_1=7.380\pm0.001$ A. and $a_3=4.238\pm0.001$ A., and the calculated density is 5.70. The experimentally determined melting point is 742° C.

*Example 32*

The procedure of Example 31 is modified by substituting hydrobromic acid for hydrochloric acid and substituting hydrogen bromide for hydrogen chloride in the drying operation. The final product, anhydrous plutonium tribromide, is a blue-green crystalline compound having the following properties:

Melting point—654° C.±4°
Crystalline structure:
  Orthorhombic
  Four molecules per uit cell.
  Lattice constants:
    $a_1=12.57\pm0.5$ A.
    $a_2=4.11\pm0.03$ A.
    $a_3=9.13\pm0.04$ A.
Calculated density—6.69.

*Example 33*

Tetravalent plutonium hydroxide is dissolved in concentrated hydrochloric acid and diluted to 0.5 N. HCl. Concentrated aqueous hydrofluoric acid is then added until the solution is 1 N. with respect to HF. The resulting precipitate is separated from the supernatant solution and dried in vacuo at room temperature. The resulting product is a green colored solid corresponding to the formula $PuF_4.2.5H_2O$, which has been found to be isomorphic with $UF_4.2.5H_2O$. The crystalline structure is orthorhombic, with eight molecules per unit cell. The lattice constants are:

$$a_1=12.63\pm0.05 \text{ A.}$$
$$a_2=11.01\pm0.05 \text{ A.}$$
$$a_3=6.98\pm0.05 \text{ A.}$$

The calculated density is 4.89.

The hydrated tetrafluoride may be dehydrated at 350° C. in a stream of hydrogen fluoride to yield the anhydrous compound. $PuF_4$ is a yellow to pale brown crystalline compound which is soluble in hot concentrated sulfuric acid or nitric acid. The crystalline structure is monoclinic with 12 molecules per unit cell. The lattice constants are:

$$a_1=12.6\pm0.1 \text{ A.}$$
$$a_2=10.6\pm0.1 \text{ A.}$$
$$a_3=8.3\pm0.1 \text{ A.}$$
$$\alpha_2=126°\pm1°$$

The calculated density is 7.0.

*Example 34*

The procedure of Example 33 is modified by saturating the hydrochloric acid solution with sulfur dioxide prior to incorporating the hydrofluoric acid. The resulting precipitate is plutonium trifluoride, which is separated from the supernatant solution and dried at 300° C. in a stream of hydrogen fluoride. The resulting product is anhydrous $PuF_3$, a crystalline solid of purple to black color having a melting point of 1141° C.±7°. The crystalline structure is hexagonal with two molecules per unit cell. The lattice constants are:

$$a_1=4.087\pm0.001 \text{ A.}$$
$$a_3=7.240\pm0.001 \text{ A.}$$

The calculated density is 9.32.

Plutonium trifluoride may be dissolved by fuming with sulfuric acid, and may be converted to plutonium dioxide by heating above 300° C. in the presence of moist air.

*Example 35*

Tetravalent plutonium hydroxide is dissolved in 16 N. nitric acid and the resulting solution is diluted to about 2N.$HNO_3$. Potassium nitrate is then added in excess of the equivalent plutonium nitrate concentration and a potassium-plutonium double fluoride is precipitated by the addition of hydrofluoric acid. The composition of the final solution from which the precipitation is made is approximately 1.8 N. $HNO_3$–0.5 N. $KNO_3$–3.0 N. HF. The precipitate is a pale green material corresponding to the empirical formula $KPuF_5.xH_2O$. After drying in vacuo at room temperature the product is obtained as an anhydrous crystalline compound conforming to the formula $KPuF_5$. The crystalline structure is rhombohedral with six molecules per unit cell. The lattice constants are:

$$a=9.33\pm0.02 \text{ A.}$$
$$\alpha=105°59'$$

Other double fluorides may be prepared by substituting other alkali metals or ammonia for the potassium in the above example.

*Example 36*

Tetravalent plutonium hydroxide is dissolved in 16 N. nitric acid and the resulting solution is diluted to 1.0 N. $HNO_3$. Potassium iodate is then added in sufficient quantity to make the solution 0.1 N. in $KIO_3$, and the resulting precipitate is separated from the supernatant solution and dried. The product is a white solid, tinged with pink. Analysis shows it to be anhydrous, conforming to the empirical formula $Pu(IO_3)_4$. Its solubility in 1.0 N. $HNO_3$–0.1 N. $KIO_3$ solution is approximately 14.6 mg. per liter.

*Example 37*

Tetravalent plutonium hydroxide is dissolved in 16 N. nitric acid and the resulting solution is diluted nearly to 1.0 M. $HNO_3$. Orthophosphoric acid is then added in an amount sufficient to produce a 0.6 M. $H_3PO_4$–1.0 M. $HNO_3$ solution. The resulting white precipitate after drying in vacuo at room temperature conforms to the emipirical formula $Pu_3(PO_4)_4.xH_2O$. This compound is isomorphic with the corresponding ceric and thorium phosphates. It is soluble in 0.6 M. $H_3PO_4$–1.0 M. $HNO_3$ to the extent of about 19 mg. Pu per liter.

*Example 38*

The procedure of Example 37 is modified by saturating the nitric acid solution with sulfur dioxide prior to incorporating the phosphoric acid. In this case the dried precipitate is a violet colored crystalline compound which conforms to the empirical formula $PuPO_4.xH_2O$. It is soluble in 0.6 M. $H_3PO_4$–1.0 M. $HNO_3$ solution to the extent of about 28 mg. Pu per liter. The crystalline structure of this compound is hexagonal, with three molecules per unit cell. The lattice constants are:

$$a_1=6.985\pm0.010 \text{ A.}$$
$$a_3=6.475\pm0.010 \text{ A.}$$

The calculated density is 6.04.

*Example 39*

Tetravalent plutonium hydroxide is dissolved in aqueous sulfuric acid to form a solution approximately 2 M. with respect to $H_2SO_4$ and approximately 0.4 M. with respect to $Pu(SO_4)_2$. About 40 percent by volume of methyl alcohol is added to the sulfuric acid solution and the mixture is allowed to stand for 16 hours. Approximately 7 percent by volume of concentrated sulfuric acid is then added, with agitation, and the precipitate is separated from the supernatant solution. The product is a light reddish pink crystalline solid which conforms on analysis to the formula $Pu(SO_4)_2 \cdot 4H_2O$.

Metallic plutonium may be produced by reduction of any of the plutonium halides with active metals such as the alkali and alkaline earth metals. Although a trihalide is desirable from the standpoint of requiring less reducing agent, a tetrahalide is advantageous from the standpoint of producing greater heat of reaction. The preferred compounds for reduction to metal are the trichloride, the trifluoride, and the tetrafluoride. Suitable metallic reducing agents comprise the class of metals having reduction potentials of at least +2 volts in the table of standard oxidation-reduction potentials of Latimer and Hildebrand (Reference Book of Inorganic Chemistry, Revised Edition, 1940, p. 474).

A suitable procedure for producing metallic plutonium comprises heating a plutonium halide with at least a stoichiometric quantity of reducing metal in an inert crucible until reaction is initiated. If heat loss is prevented, the heat of reaction will usually be sufficient to complete the reduction. However, external heating may suitably be continued during the reaction to insure a sufficiently high temperature to permit separation of molten metal and molten slag phases. The maximum reaction temperature may vary over a considerable range, e.g., 700–1300 C., but is preferably within the range 850–1150° C.

If the reactants are non-volatile at the reaction temperature, an open crucible may be employed. When sodium, potassium, cesium, or rubidium is used as the reducing agent, a closed bomb is desirable to prevent loss of the alkali metal vapor before reduction of the plutonium halide is effected. Even when non-volatile reactants are employed it is convenient to use a closed bomb to prevent access of oxygen to the reaction mass. Preferably the bomb is evacuated after charging, and the air is replaced with an inert gas.

The bomb liners or crucibles may be formed of any suitable inert refractory such as calcium oxide or beryllium oxide. Such liners or crucibles are preferably degassed at high temperatures prior to use. If the refractory employed is quite porous, an excess of reducing metal up to 200 percent or 300 percent may be required to allow for soakage into the crucible or bomb liner. With vitrified refractories, on the other hand, the reducing metal may suitably be used in an amount about 25 percent in excess of the stoichiometric quantity.

After the reduction is completed and the product has cooled, the crucible or bomb liner is removed from the reaction mass, usually by breaking the refractory, and the bulk of the slag is mechanically separated from the metal ingot. Residual excess reducing agent and soluble slag may be removed by leaching with water and with glacial acetic acid. Further purification of the metal is obtained by vacuum remelting and casting.

The following examples further illustrate the production of metallic plutonium:

*Example 40*

Plutonium trichloride was placed in a beryllium oxide crucible and covered with metallic sodium in an amount considerably in excess of the stoichiometric quantity. The crucible was then placed in an electric resistance furnace. The furnace was evacuated and the charge was heated to 800–850 C. the total heating time being ten minutes. The excess sodium distilled off during and after the reaction, and the sodium chloride slag was absorbed in the pores of the crucible. After cooling, about half of the plutonium was found in a single mass of metal, the remainder being scattered around the crucible in small globules.

*Example 41*

Plutonium trifluoride and 22 percent by weight of metallic lithium, based on the weight of the plutonium trifluoride, were placed in a beryllium oxide crucible. A tantalum cover was sealed on the crucible in an inert atmosphere, using fused barium chloride to effect the seal. The sealed crucible was then placed in a stainless steel bomb which was heated to 1100° C. in five minutes in an induction furnace. On cooling, the plutonium metal was found to be in a single mass, adhering to the crucible wall. The weight of the product amounted to 94.5 percent of the theoretical yield of metal from the charge of trifluoride.

Pure plutonium metal has a melting point of 627° C.±5°. It has a bright metallic appearance, and can be distinguished from metallic appearing lower oxides by its ability to form plutonium hydride. It is more electropositive than thorium and uranium and less electropositive than magnesium. In spite of its strongly electropositive nature, it may be exposed to the atmosphere at room temperatures and moderate humidities for long periods without appreciable corrosion. The corrosion rate increases however, at high temperatures or at high humidities. The metal is vigorously attacked by hydrochloric acid in all concentrations. There is no visible attack by nitric acid, in any concentration, over a period of hours, and a metal specimen will remain bright in nitric acid for at least 15 minutes. Concentrated sulfuric acid initially attacks plutonium, but gas evolution ceases in a few minutes. The metal dissolves in dilute sulfuric acid at a moderate rate.

Metallic plutonium exists in a plurality of allotropic forms. The alpha phase, which has a transformation temperature of 115° C., has an orthorhombic structure and is hard and rather brittle. Its density at 25° C. is 19.8±0.5. Higher temperature allotropic phases are softer and more malleable than the alpha phase, and have considerably lower densities. Reverse transformations occur with supercooling, and will take place slowly at room temperature if the metal is quenched after high temperature annealing. Small amounts of impurities appear to stabilize the high temperature phases when quenched to room temperature. The density of such quenched metal ranges from about 15.8 to about 16.5, depending on the annealing temperature.

Metallic plutonium and the various plutonium compounds which have been described above are extremely useful for the production of atomic energy. $Pu^{239}$ in the metallic state, or in the form of any of the compounds previously described, can undergo nuclear fission in a self-sustaining neutronic chain reaction. The critical size of a single mass of plutonium metal for self-sustaining chain reaction is of the order of 10 kg. The critical size of a single mass of fused plutonium trichloride is of the order of 25 kg., and the critical sizes for the other compounds described above will lie between that of the metal and that of the trichloride. When the plutonium or plutonium compound is dispersed in a neutron-slowing material, termed a "moderator," the critical mass for self-sustaining chain reaction becomes very much less than for the pure material. Under optimum conditions, the critical mass of plutonium may be as low as 200 grams. This quantity of plutonium in a single mass of material should not be exceeded without providing adequate neutron-absorbing safety devices.

Plutonium or mixtures of plutonium and other fissionable isotopes may be utilized for the production of atomic energy in neutronic reactors in accordance with the disclosure of co-pending application Serial No. 634,311, of Emilio Segre, Joseph W. Kennedy, and Glenn T. Seaborg filed on December 11, 1945 and patented on October 13, 1959 as U.S. Patent No. 2,908,621. In such utilization, metallic plutonium may be dispersed in a solid moderator such as graphite in a lattice structure, or any of the plutonium compounds described above may be employed as solutions or dispersions in a liquid moderator such as deuterium oxide.

Metallic $Pu^{238}$ and $Pu^{239}$ and all of the compounds of these isotopes are also useful as sources of alpha radiation. In conjunction with $\alpha$-$n$ reacting elements such as beryllium, they may also be employed as neutron sources.

It is to be understood that this aspect of the present invention is not limited to the specific compounds and methods of preparation which have been described above by way of illustration. Other analogous compounds and equivalent methods of preparation are included in the scope of this phase of the invention.

A further phase of the present invention relates to combination processes for the production and recovery of plutonium.

An object of this aspect of the invention is to provide processes for the production of plutonium from uranium and for the recovery of the resulting plutonium substantially free from uranium and other contaminating elements.

Another object of this phase of the invention is to provide suitable combinations of the procedures of the previously described phases of our invention, adapted for the production of plutonium from natural uranium by neutron irradiation and the recovery of the resulting plutonium substantially free from unreacted uranium and from radioactive uranium fission products.

Other objects and advantages of this aspect of the present invention will be apparent from the following description.

In accordance with this phase of the invention, natural uranium is subjected to neutron or deuteron bombardment, the bombarded material is aged for a time such that the combined time of bombardment and aging is sufficient to produce a total transuranic fraction comprising at least 90 percent plutonium, the plutonium and radioactive uranium fission products are separated from the unconverted uranium, the plutonium is decontaminated with respect to fission products by a suitable combination of carrier precipitations, and a decontaminated carrier-free plutonium composition is recovered after the final carrier precipitation.

When uranium has been subjected to neutron irradiation for 100 days in a neutronic reactor operated at a power level of 2500 kilowatts per ton of uranium, the radiation associated with a ton of metal immediately after removal from the reactor is about $10^8$ curies. The magnitude of this value may be realized from the fact that it requires more than a hundred tons of radium to produce $10^8$ curies of radiation. If the bombarded uranium is allowed to age for 60 days prior to processing, the radiation will have decayed to about $10^5$ curies per ton. A ton of such metal will contain about 250 g. of plutonium and a roughly equivalent weight of uranium fission products. The recovery problem is to separate the 250 g. of plutonium from the ton of uranium and to free the plutonium from fission products to an extent sufficient to reduce the radiation associated with it to 10 millicuries or less (10 millicuries is about the maximum amount of radiation with which operating personnel can work routinely, with some lead shielding and other precautions). A radiation decontamination factor of $10^7$ must thus be achieved in the recovery of the plutonium in this particular instance. The factor will vary with the time and power level of irradiation and time of aging. It may be estimated in any case, however, by measuring the radiation from an aliquot of the material to be processed and determining the ratio of the total radiation to the desired final radiation, e.g. 10 millicuries. The required decontamination factors will generally range from $10^4$ to $10^8$.

It will be evident that the decontamination factor required in any given case may be attained by various combinations of carrier oxidation-reduction cycles, scavenger precipitations, alternate carrier cycles, or carrier crossover cycles. An estimate of the over-all decontamination which can be achieved by any proposed combination of carrier operations may be made on the basis of the following decontamination factors for individual steps of the process:

| Proposed operation: | Decontamination factor |
|---|---|
| Oxidation-reduction cycle with single carrier | 50 |
| Use of scavengers in contaminant carrying step | 10 |
| Change to different carrier | 10 |

The estimated over-all decontamination factor is the product of all of the individual decontamination factors for the proposed operations. On this basis, a process comprising four oxidation-reduction cycles with the same carrier, employing scavengers in one of the cycles, would have an estimated over-all decontamination factor of $6.25 \times 10^6$. Similarly, a process comprising two oxidation-reduction cycles with the same carrier, using scavengers in one cycle, followed by an oxidation-reduction cycle with a different carrier, would have an estimated over-all decontamination factor of $1.25 \times 10^7$. The over-all factors for numerous other combinations of carrier operations may readily be estimated in a similar manner. Such estimates will serve as a first approximation in designing a suitable over-all process, but it is to be understood that such factors are not exact, and that modifications of any proposed over-all process may be required after preliminary test operation. The extent and direction of any process changes indicated by a preliminary test run will be evident to those skilled in the art in view of the general discussion and the numerous specific examples of the present application.

Figure 2:
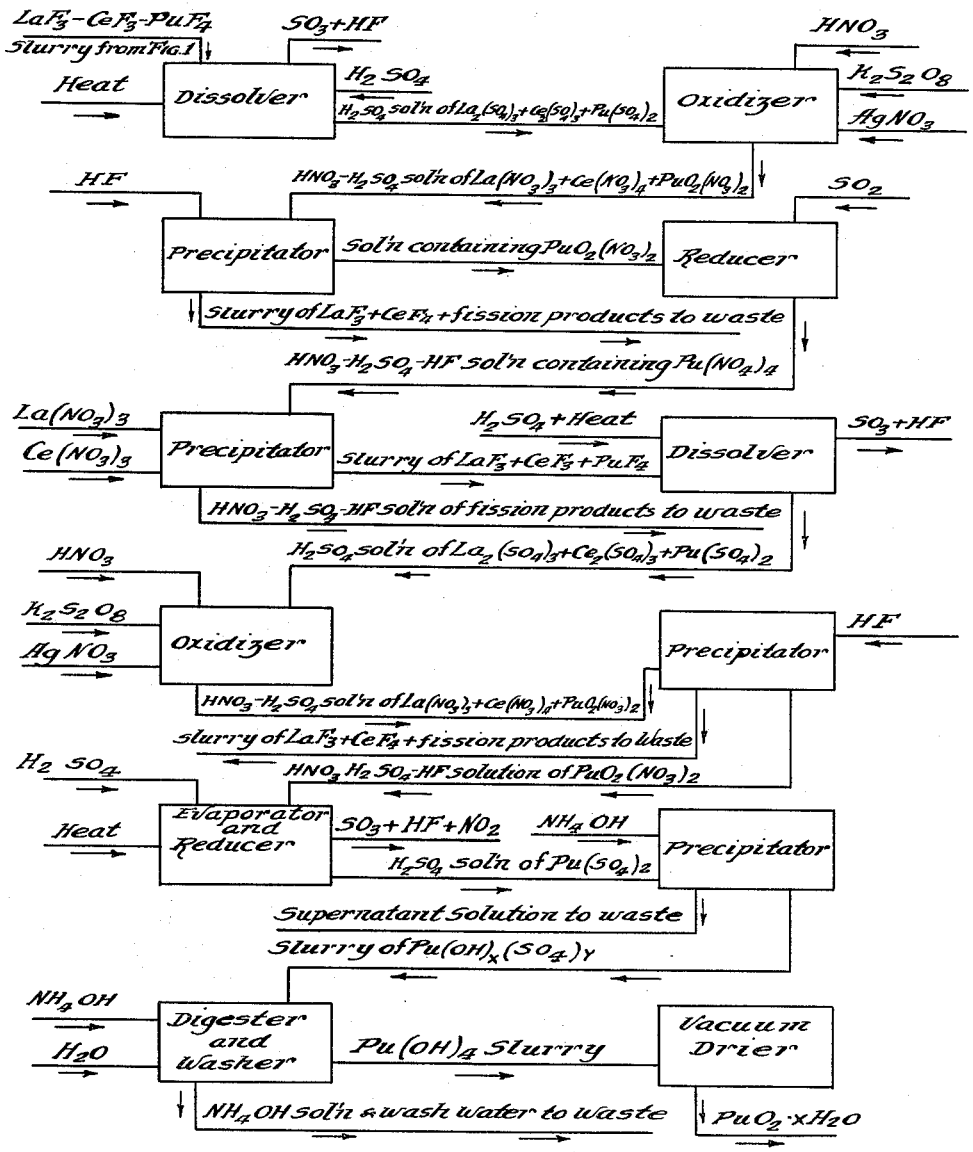
Figure 3:
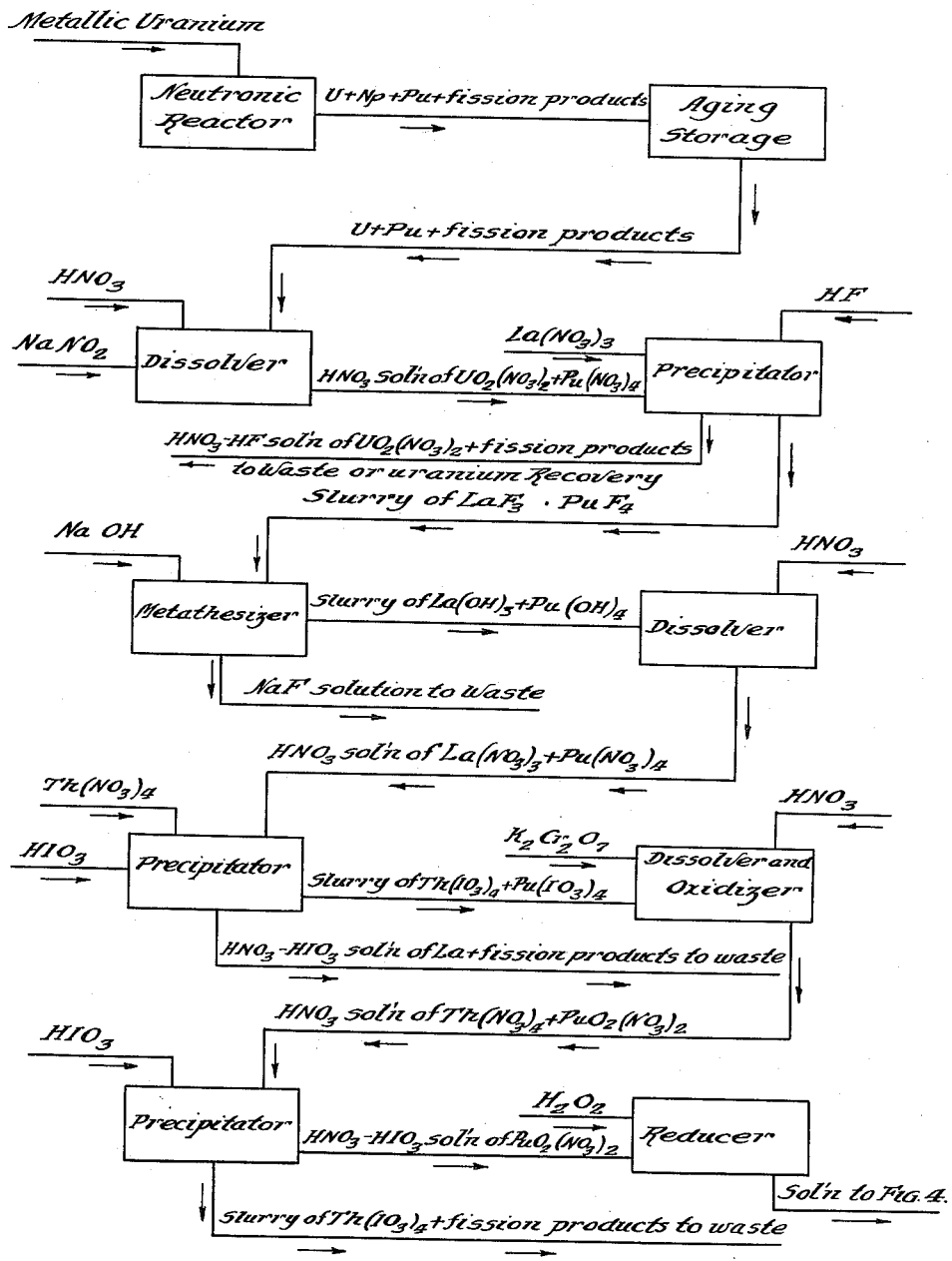
Figure 4:
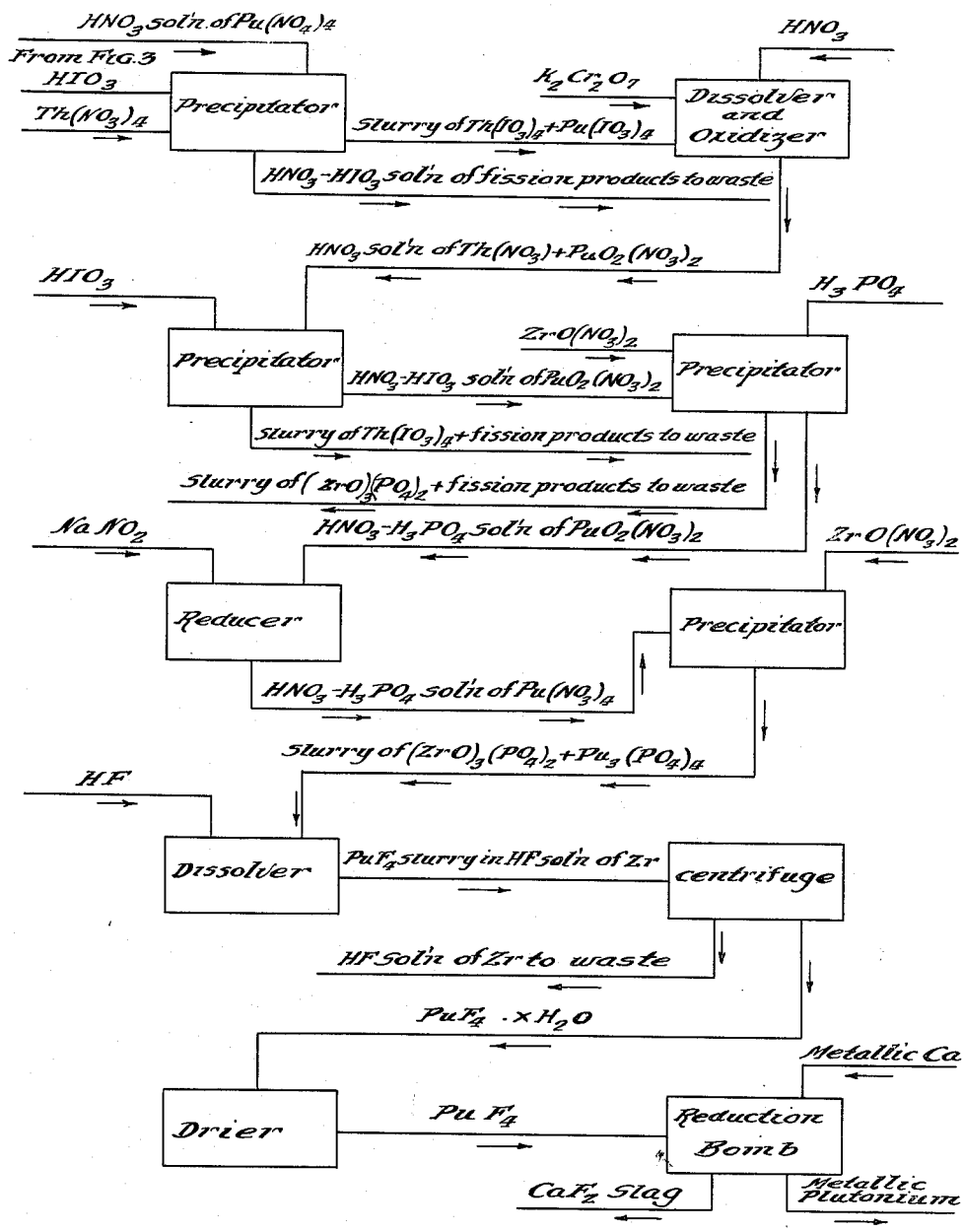

Two representative over-all processes for the production and recovery of plutonium are set forth in the form of flow diagrams in FIGS. 1–2 and in FIGS. 3–4 of the accompanying drawings. These flow diagrams are self-explanatory in view of the detailed captions and in the light of the foregoing description of the individual process steps involved. It is to be understood, of course, that these particular over-all processes are merely illustrative, and do not limit the scope of the present invention.

In general, it may be said that all of the specific compositions and processes disclosed in the present application are illustrative, rather than limiting in scope, and that all of the numerous equivalents and modifications which would naturally occur to those skilled in the art are included in the scope of the present invention. Only such limitations as are indicated in the appended claims should be imposed on the scope of this invention.

What is claimed is:

1. A process for the production of plutonium which comprises subjecting a mixture of $U^{238}$ and a fissionable isotope to a self-sustaining neutronic chain reaction, aging the reacted material, the combined time of reaction and aging being sufficient to produce a total transuranic fraction comprising at least 90 percent plutonium, and separating plutonium from the aged reacted material.

2. A process for the production of plutonium which comprises subjecting a mixture of uranium isotopes $U^{235}$ and $U^{238}$ to a self-sustaining neutronic chain reaction, aging the reacted material for a time such that the combined time of reaction and aging is sufficient to produce a total transuranic fraction comprising at least 90 percent plutonium, separating unreacted uranium from the aged reacted material separating uranium fission products from the resulting uranium-free material and recovering a substantially pure plutonium compound from the residual material.

3. A process for the production of plutonium which comprises subjecting a mixture of uranium isotopes $U^{235}$ and $U^{238}$ to a self-sustaining neutronic chain reaction, aging the reacted material for a time such that the combined time of reaction and aging is sufficient to produce a total transuranic fraction comprising at least 90 percent plutonium, separating uranium fission products and plutonium from the unreacted uranium in the aged reacted material, effecting a plurality of carrier precipitations from aqueous inorganic acid solutions containing said plutonium and uranium fission products, precipitating a substantially pure plutonium compound from the resulting solution, and separating said plutonium compound from the supernatant solution.

4. A process for the production of plutonium which comprises subjecting a mixture of uranium isotopes $U^{235}$ and $U^{238}$ to a self-sustaining neutronic chain reaction, aging the reacted material for a time such that the combined time of reaction and aging is sufficient to produce a total transuranic fraction comprising at least 90 percent plutonium, separating uranium fission products and plutonium from the unreacted uranium in the aged reacted material, effecting a plurality of precipitations of carriers of different chemical composition from aqueous inorganic acid solutions containing said uranium fission products and said plutonium in the hexavalent state, whereby plutonium solutions of decreased fission product concentrations are obtained, effecting a plurality of precipitations of carriers of different chemical composition from aqueous inorganic acid solutions containing said uranium fission products and said plutonium in a valence state not greater than +4 whereby plutonium-containing precipitates of decreased fission product content are obtained, repeating said carrier precipitations with decreasing quantities of carriers for a sufficient number of time to obtain plutonium solution substantially free from fission products precipitating a substantially pure plutonium compound from said solution, and separating said plutonium compound from the supernatant solution.

References Cited by the Examiner

UNITED STATES PATENTS

| | | | |
|---|---|---|---|
| 2,206,634 | 7/40 | Fermi et al. | 176—11 |
| 2,708,656 | 5/55 | Fermi et al. | 176—41 |
| 2,785,951 | 3/57 | Thompson et al. | 23—14.5 |
| 2,990,242 | 6/61 | Seaborg | 23—14.5 |
| 2,992,888 | 7/61 | Balthis | 23—14.5 |

OTHER REFERENCES

Anderson et al.: Physical Review, vol. 55, pp. 511–12 (1939).

McMillan et al.: Physical Review, vol. 57, pp. 1185–6 (1940).

Pollard et al.: Applied Nuclear Physics, pp. 187–199 (1942); published by John Wiley & Sons, Inc., N.Y.

Seaborg: Chemical & Engineering News, vol. 23, pp. 2190–3 (1945).

Peppard et al.: Journal of the American Chemical Society, vol. 73, pp. 2529–31 (June 1951).

CARL D. QUARFORTH, *Primary Examiner.*

REUBEN EPSTEIN, WILLIAM G. WILES,
*Examiners.*